(12) United States Patent
Ishibashi et al.

(10) Patent No.: US 10,998,824 B2
(45) Date of Patent: May 4, 2021

(54) ELECTRIC POWER CONVERSION DEVICE

(71) Applicant: Mitsubishi Electric Corporation, Chiyoda-ku (JP)

(72) Inventors: Takaharu Ishibashi, Chiyoda-ku (JP); Takushi Jimichi, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 283 days.

(21) Appl. No.: 16/078,148

(22) PCT Filed: Dec. 19, 2016

(86) PCT No.: PCT/JP2016/087826
§ 371 (c)(1),
(2) Date: Aug. 21, 2018

(87) PCT Pub. No.: WO2017/163508
PCT Pub. Date: Sep. 28, 2017

(65) Prior Publication Data
US 2019/0058409 A1    Feb. 21, 2019

(30) Foreign Application Priority Data

Mar. 22, 2016  (JP) .............................. JP2016-056407

(51) Int. Cl.
*H02J 1/00*  (2006.01)
*H02J 3/00*  (2006.01)
(Continued)

(52) U.S. Cl.
CPC ........... *H02M 3/33584* (2013.01); *H02J 3/36* (2013.01); *H02J 3/386* (2013.01); *H02M 3/285* (2013.01);
(Continued)

(58) Field of Classification Search
CPC ............... H02M 3/33584; H02M 1/14; H02M 2001/0058; H02M 2010/0077;
(Continued)

(56) References Cited

U.S. PATENT DOCUMENTS

| | | | | |
|---|---|---|---|---|
| 5,027,264 A | * | 6/1991 | DeDoncker | ....... H02M 3/33584 363/129 |
| 2013/0003431 A1 | * | 1/2013 | Reddy | ..................... H02M 1/14 363/126 |
| 2014/0028092 A1 | * | 1/2014 | Takeshima | .......... H02M 3/3376 307/10.1 |

FOREIGN PATENT DOCUMENTS

| | | |
|---|---|---|
| EP | 2 341 594 A1 | 7/2011 |
| JP | 2015-6066 A | 1/2015 |

(Continued)

OTHER PUBLICATIONS

International Search Report dated Feb. 14, 2017 in PCT/JP2016/087826 filed on Dec. 19, 2016.
(Continued)

*Primary Examiner* — Rexford N Barnie
*Assistant Examiner* — Rasem Mourad
(74) *Attorney, Agent, or Firm* — Xsensus LLP

(57) ABSTRACT

A power conversion device includes M number of DC/DC converters, first-side terminals of the DC/DC converters are connected so that common current flows between both positive and negative terminals of first DC terminals of the power conversion device, and second-side terminals thereof are connected so that common current flows between both positive and negative terminals of second DC terminals of the power conversion device. The power conversion device further includes M-1 number of auxiliary converters each connected between two DC/DC converters and performing DC/DC conversion. The DC/DC converters control voltages of the second-side terminals and input voltage of the power
(Continued)

conversion device. Each auxiliary converter controls voltages of the first-side terminals of the two DC/DC converters so as to be equalized.

20 Claims, 17 Drawing Sheets

(51) Int. Cl.
*H02M 3/335* (2006.01)
*H02J 3/36* (2006.01)
*H02J 3/38* (2006.01)
*H02M 1/00* (2006.01)
*H02M 3/28* (2006.01)

(52) U.S. Cl.
CPC ............... *H02M 2001/0058* (2013.01); *H02M 2001/0074* (2013.01); *H02M 2001/0077* (2013.01)

(58) Field of Classification Search
CPC ........... H02M 3/285; H02M 2001/0074; H02J 3/386; H02J 3/36; Y02B 70/1491; Y02B 10/763
See application file for complete search history.

(56) References Cited

FOREIGN PATENT DOCUMENTS

| JP | 2015006066 A | * | 1/2015 | |
|---|---|---|---|---|
| WO | WO 2013/013858 A1 | | 1/2013 | |
| WO | WO-2013013858 A1 | * | 1/2013 | ............... H02J 3/36 |

OTHER PUBLICATIONS

Extended European Search Report dated Mar. 28, 2019 in Patent Application No. 16895531.8, citing document AA therein, 8 pages.

* cited by examiner

ELECTRIC POWER CONVERSION DEVICE

TECHNICAL FIELD

The present invention relates to a power conversion device that converts DC power to DC power having different voltage, and in particular, relates to a power conversion device used for high-voltage DC power transmission.

BACKGROUND ART

In recent years, in offshore wind power generation, the amount of electric generation has been increasing with size increase in windmills, and the distance between a substation facility and windmills installed offshore has become further long. Powers generated by a plurality of electric generators are collected and transmitted to a substation facility. In order to cope with increase in the amount of electric generation by the electric generators and increase in the power transmission distance, high-voltage DC power transmission is considered in which the collected voltage is efficiently transmitted by direct current with increased voltage.

A DC step-up conversion unit which is a conventional power conversion device used for high-voltage DC power transmission has, in one mode, input terminals for receiving input DC power to be DC power. The DC step-up conversion unit has a converter section which has a plurality of insulation-type DC-DC converters and in which first terminals of the plurality of insulation-type DC-DC converters are connected in parallel to the input terminals. The DC step-up conversion unit has output terminals which are connected in series to second terminals of the plurality of insulation-type DC-DC converters and from which output DC power which is DC power having voltage stepped up by the converter section is outputted. The DC step-up conversion unit has, as a converter section controller for controlling the converter section so that voltage of the input DC power becomes predetermined voltage, a first converter section controller provided for each of the plurality of insulation-type DC-DC converters of the converter section, and a second converter section controller (see, for example, Patent Document 1).

In another example of conventional power conversion devices used for high-voltage DC power transmission, a plurality of DC/DC converters are connected in series on both the input side and the output side (see, for example, Patent Document 2).

CITATION LIST

Patent Document

Patent Document 1: Japanese Laid-Open Patent Publication No. 2015-6066
Patent Document 2: International Publication No. WO2013/013858

SUMMARY OF THE INVENTION

Problems to be Solved by the Invention

In the DC step-up conversion unit described in Patent Document 1, inputs of the plurality of insulation-type DC/DC converters are connected in parallel and outputs thereof are connected in series. Therefore, the usage is limited to the case where input voltage of the DC step-up conversion unit is equal to or lower than the withstand voltage of semiconductor switching elements in each insulation-type DC/DC converter. That is, it is difficult for the DC step-up conversion unit to use, as the input power, high-voltage DC power obtained by collecting generated powers from a plurality of electric generation devices.

The power conversion device described in Patent Document 2 is applicable to high-voltage input power, but the input voltage needs to be stable. Therefore, if power is inputted from a DC power source having varying voltage, it is difficult to reliably perform output control.

The present invention has been made to solve the above problems, and an object of the present invention is to provide a power conversion device that, without increasing the element withstand voltages, allows input of high-voltage DC power from a power source having varying voltage and can reliably perform output control.

Solution to the Problems

A power conversion device according to the present invention includes: a power conversion unit including M number of DC/DC converters between first DC terminals and second DC terminals each pair of which is composed of both positive and negative terminals, where M is two or greater, the power conversion unit performing power transmission between the first DC terminals and the second DC terminals; and a controller for controlling the power conversion unit. The power conversion unit further includes one or more balancing circuits each connected between two of the DC/DC converters and balancing powers of the two DC/DC converters. In the M number of DC/DC converters, one of input and output thereof is defined as a first side and the other one is defined as a second side, first-side terminals of the DC/DC converters are connected so that current flows in common between both positive and negative terminals of the first DC terminals, and second-side terminals of the DC/DC converters are connected so that current flows in common between both positive and negative terminals of the second DC terminals. Each balancing circuit is connected between two pairs of the first-side terminals of the two DC/DC converters, and receives and passes power between the two pairs of first-side terminals.

Effect of the Invention

The power conversion device according to the present invention can achieve power conversion that allows input of high-voltage DC power without increasing element withstand voltage and enables reliable output control even when power is inputted from a power source having varying voltage.

DESCRIPTION OF EMBODIMENTS

Embodiment 1

Hereinafter, embodiment 1 of the present invention will be described.

Figure 1:
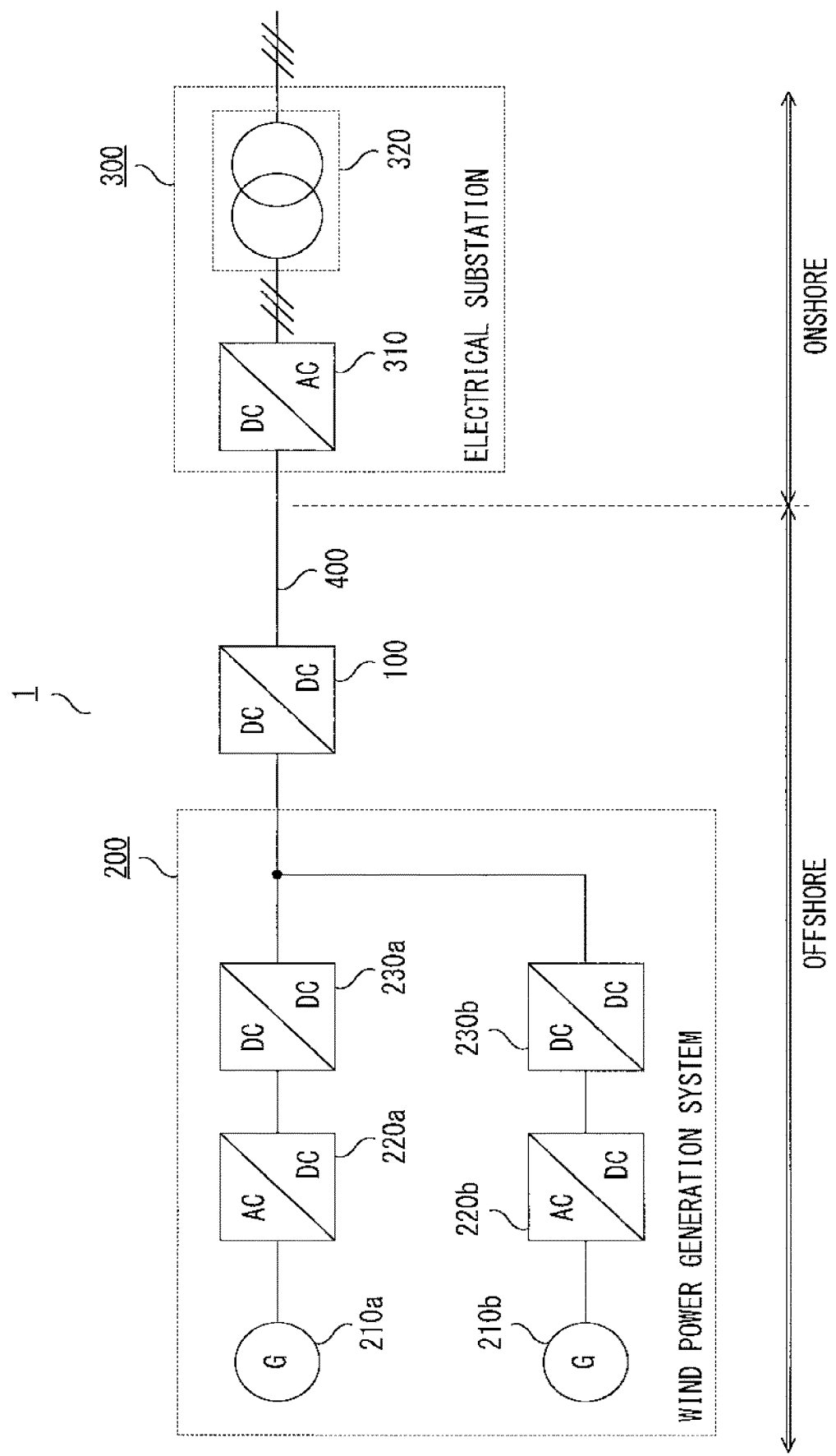
FIG. 1 is a diagram showing the schematic configuration of a power transmission system to which a power conversion device according to embodiment 1 of the present invention is applied.

FIG. 1 is a schematic configuration diagram showing an example of a power transmission system 1 including a power conversion device 100 according to embodiment 1 of the present invention. As shown in FIG. 1, the power transmission system 1 includes: a wind power generation system 200 and a power conversion device 100 provided offshore; an electrical substation 300 provided onshore; and a DC power transmission cable 400 as a DC power transmission line.

The wind power generation system 200 includes: electric generators 210a, 210b as a plurality of electric generation devices; power conditioners 220a, 220b which receive respective generated powers and perform conversion from AC power to DC power; and step-up DC/DC conversion units 230a, 230b which step up voltages of DC powers outputted from the power conditioners 220a, 220b. In the wind power generation system 200, DC powers outputted from the step-up DC/DC conversion units 230a, 230b are collected together and outputted.

The DC power outputted from the wind power generation system 200 is inputted to the power conversion device 100.

DC power outputted from the power conversion device 100 is transmitted to the electrical substation 300 via the DC power transmission cable 400. The electrical substation 300 includes: a DC/AC conversion unit 310 which receives DC power outputted from the power conversion device 100 and converts the DC power to AC power; and a transformer 320 which steps up voltage of the AC power from the DC/AC conversion unit 310.

In the example shown in FIG. 1, the power source is wind power generation, but is not limited thereto. Another power source in which the amount of power generation varies, e.g., a power supply using natural energy such as a photovoltaic generation device, may be used.

In this case, the wind power generation system 200 includes two electric generators 210a, 210b, two power conditioners 220a, 220b, and two step-up DC/DC conversion units 230a, 230b. However, without limitation thereto, the numbers of these components are optional. Further, although the wind power generation system 200 and the power conversion device 100 are provided offshore and the electrical substation 300 is provided onshore, the arrangement is not limited thereto.

Although the case of applying the power conversion device 100 to the power transmission system 1 is shown, the power conversion device 100 may be applied to DC distribution or the like, instead of DC power transmission.

Figure 2:
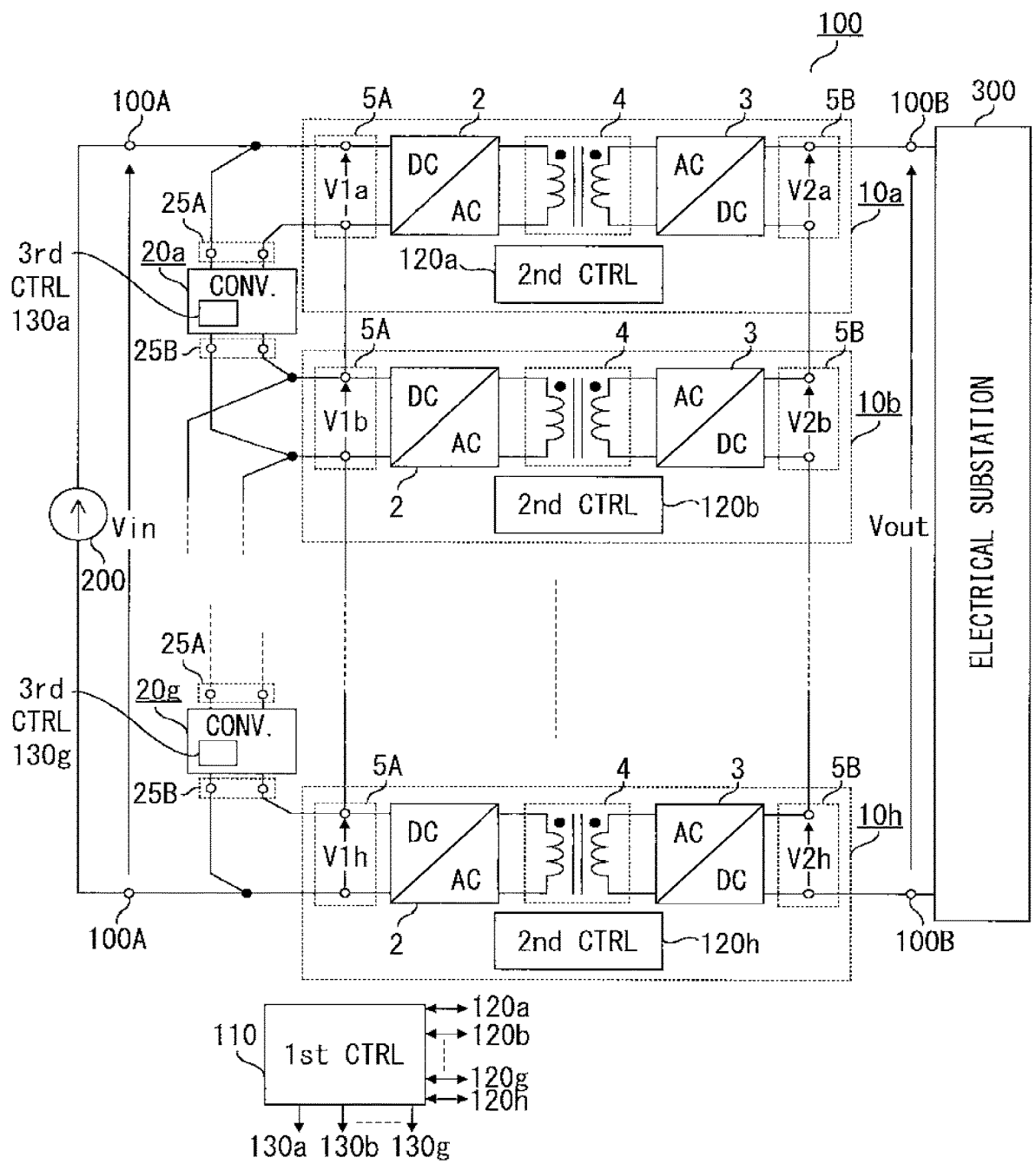
FIG. 2 is a diagram showing the configuration of the power conversion device according to embodiment 1 of the present invention.

FIG. 2 is a diagram showing the configuration of the power conversion device 100.

As shown in FIG. 2, the power conversion device 100 has first DC terminals 100A and second DC terminals 100B each pair of which is composed of both positive and negative terminals, and includes, between the first DC terminals 100A and the second DC terminals 100B, a plurality (M number) of DC/DC converters 10 (10a to 10h), and auxiliary converters 20 (20a to 20g) as balancing circuits. Each auxiliary converter 20 is connected between two DC/DC converters 10.

In this case, the auxiliary converters 20 each connected between adjacent two DC/DC converters 10 are used as the balancing circuits, but without limitation thereto, anything that is connected between two DC/DC converters 10 and balances powers of the two DC/DC converters 10 may be used.

In addition, the power conversion device 100 includes a controller for performing output control of the DC/DC converters 10 and the auxiliary converters 20 of the main circuit (power conversion unit). The controller includes: a first control unit 110 for controlling the entire main circuit; second control units 120 (120a to 120h) for controlling the respective DC/DC converters 10; and third control units 130 (130a to 130g) for controlling the respective auxiliary converters 20.

Input voltage Vin of the power conversion device 100 is controlled to be target voltage Vin*, e.g., 25 kV, by the power conversion device 100. Output voltage Vout of the power conversion device 100 is controlled to be predetermined voltage, e.g., 350 kV, by the DC/AC conversion unit 310 of the electrical substation 300.

In the present embodiment 1, DC power from the wind power generation system 200 is inputted to the first DC terminals 100A. That is, the first DC terminals 100A serve as the input terminals of the main circuit (power conversion unit) of the power conversion device 100, and the input voltage Vin is voltage of the first DC terminals 100A. In addition, the second DC terminals 100B serve as the output terminals of the main circuit of the power conversion device 100, and the output voltage Vout is voltage of the second DC terminals 100B. Output power from the power conversion device 100 is outputted to the electrical substation 300 via the DC power transmission cable 400 (not shown).

Each DC/DC converter 10 includes: DC terminals 5A (hereinafter, first-side terminals 5A) on the primary side as the first side; DC terminals 5B (hereinafter, second-side terminals 5B) on the secondary side as the second side; a DC/AC conversion unit 2 on the primary side; a DC/AC conversion unit 3 on the secondary side; and a single-phase transformer 4 as a transformer. It is noted that, if insulation is not needed, only inductance LS may be connected instead of the single-phase transformer 4.

The second control units 120 are provided for the respective DC/DC converters 10.

Figure 3:
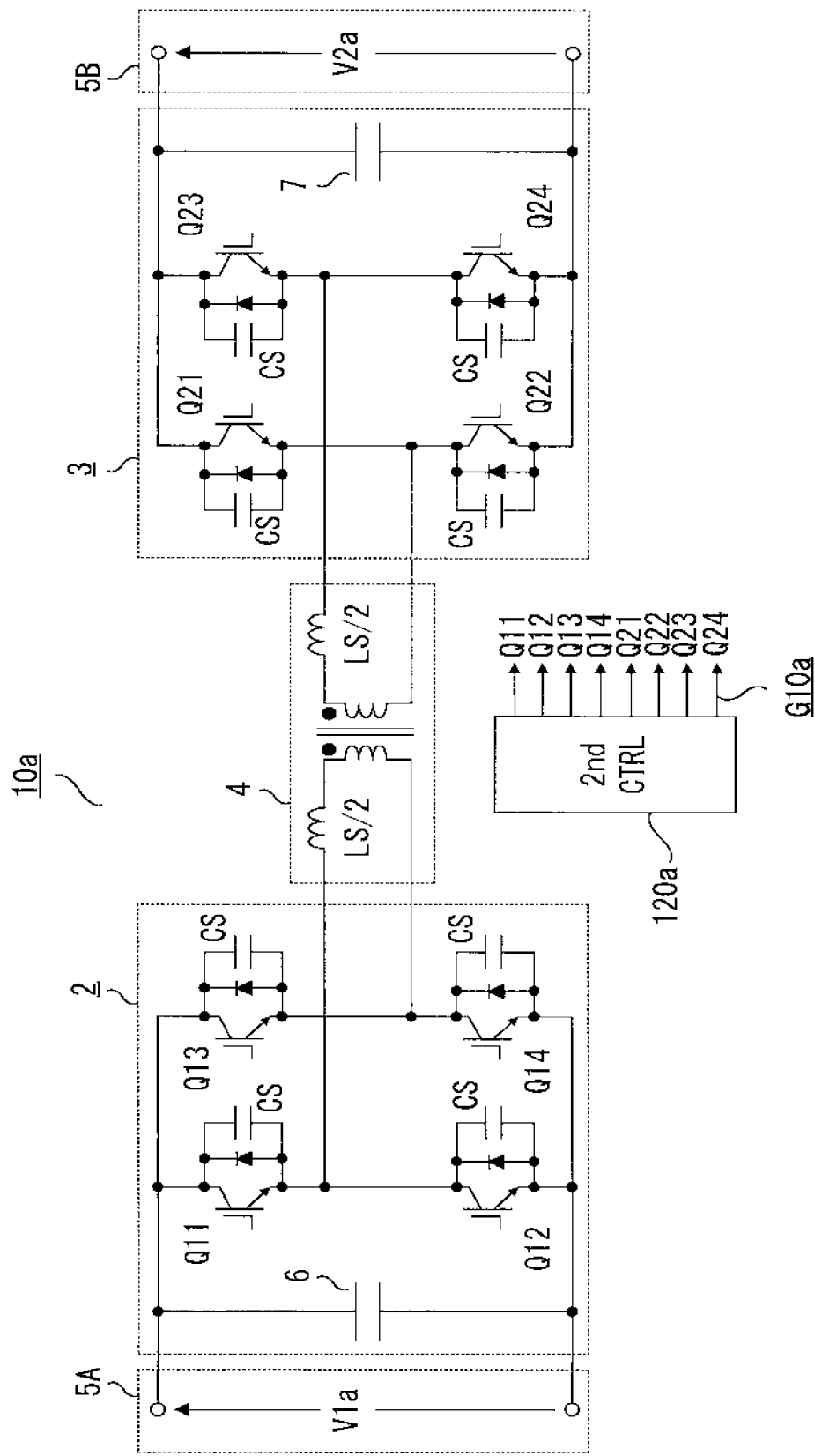
FIG. 3 is a circuit diagram showing a DC/DC converter according to embodiment 1 of the present invention.

FIG. 3 shows an example of a circuit diagram of the DC/DC converter 10a. It is noted that there are various types of converters as the DC/DC converters 10, and an appropriate type is selected in accordance with, for example, rated voltage, conversion capacity, operation frequency, and the like. The other DC/DC converters 10b to 10h are the same as the DC/DC converter 10a.

As shown in FIG. 3, the DC/AC conversion unit 2 on the primary side includes: a DC capacitor 6 connected between both poles of the first-side terminals 5A; and a first full-bridge circuit formed by two switching legs composed of semiconductor switching elements Q11 to Q14 as positive-side and negative-side semiconductor elements connected in series. The DC/AC conversion unit 3 on the secondary side includes: a DC capacitor 7 connected between both poles of the second-side terminals 5B; and a second full-bridge circuit formed by two switching legs composed of semiconductor switching elements Q21 to Q24 as positive-side and negative-side semiconductor elements connected in series. The single-phase transformer 4 is connected between intermediate connection points of the switching legs of the DC/AC conversion unit 2 and intermediate connection points of the switching legs of the DC/AC conversion unit 3.

As the semiconductor switching elements Q11 to Q24, for example, semiconductor switching elements having a self-turn-off function, such as IGBTs (Insulated Gate Bipolar Transistors), to which diodes are connected in antiparallel, are used. Each semiconductor switching element Q11 to Q24 may be used with a plurality of semiconductor switching elements combined in parallel, depending on the current capacity.

In this case, a snubber capacitor CS is connected in parallel to each semiconductor switching element Q11 to Q24. Owing to effects of the snubber capacitor CS and the inductance LS of the AC output line, zero voltage switching which is soft switching of each semiconductor switching element Q11 to Q24 becomes possible.

The second control unit 120a generates gate signals G10a for the semiconductor switching elements Q11 to Q24 in the DC/DC converter 10a, thereby controlling switching of the semiconductor switching elements Q11 to Q24.

In this case, by soft switching of the semiconductor switching elements Q11 to Q24, switching loss can be reduced, the operation frequency can be increased, and the size of the single-phase transformer 4 can be reduced. It is noted that soft switching is technology in which, using a resonance phenomenon, voltage or current applied to a semiconductor switching element during a switching transient period is reduced to reduce switching loss and electromagnetic noise. As the inductance LS, the leakage inductance of the single-phase transformer 4 may be used.

The DC/DC converter 10a is a circuit that converts DC voltage V1a applied to the first-side terminals 5A, to DC voltage V2a applied to the second-side terminals 5B, via the DC/AC conversion unit 2, the single-phase transformer 4, and the DC/AC conversion unit 3, and can be freely controlled so as to perform bidirectional power conversion. It is desirable that the turns ratio of the single-phase transformer 4 is matched with the ratio of the DC voltage V1a on the primary side and the DC voltage V2a on the secondary side. It is noted that the DC/DC converter 10a, in normal operation, steps up the primary-side voltage V1a on the input voltage Vin side and outputs the secondary-side voltage V2a to the output voltage Vout side.

As the DC capacitors 6, 7, electrolytic capacitors, film capacitors, or the like are used. High-frequency current flows through the DC capacitors 6, 7, but in the case of using film capacitors, deterioration due to the high-frequency current can be suppressed and thus the life of the capacitors is prolonged.

As shown in FIG. 2, the first-side terminals 5A of the M number of DC/DC converters 10a to 10h are connected so that common current flows between both positive and negative terminals of the first DC terminals 100A of the power conversion device 100, and the second-side terminals 5B of the DC/DC converters 10a to 10h are connected so that common current flows between both positive and negative terminals of the second DC terminals 100B of the power conversion device 100.

That is, when current Iin is flowing through both positive and negative terminals of the first DC terminals 100A of the power conversion device 100, current flowing through the first-side terminals 5A of each DC/DC converter 10a to 10h is Iin. In addition, when current Iout is flowing through both positive and negative terminals of the second DC terminals 100B of the power conversion device 100, current flowing through the second-side terminals 5B of each DC/DC converter 10a to 10h is Iout.

That is, the positive terminal of the first-side terminals 5A of the DC/DC converter 10a is connected to the positive terminal of the first DC terminals 100A, and the negative terminal of the first-side terminals 5A of the DC/DC converter 10a is connected to the positive terminal of the first-side terminals 5A of the DC/DC converter 10b. Similarly, the negative terminals of the first-side terminals 5A of the DC/DC converters 10b to 10g are respectively connected to the positive terminals of the first-side terminals 5A of the DC/DC converters 10c to 10h. The negative terminal of the first-side terminals 5A of the DC/DC converter 10h is connected to the negative terminal of the first DC terminals 100A.

The positive terminal of the second-side terminals 5B of the DC/DC converter 10a is connected to the positive terminal of the second DC terminals 100B, and the negative terminal of the second-side terminals 5B of the DC/DC converter 10a is connected to the positive terminal of the second-side terminals 5B of the DC/DC converter 10b. Similarly, the negative terminals of the second-side terminals 5B of the DC/DC converters 10b to 10g are respectively connected to the positive terminals of the second-side terminals 5B of the DC/DC converters 10c to 10h. The negative terminal of the second-side terminals 5B of the DC/DC converter 10h is connected to the negative terminal of the second DC terminals 100B.

Each auxiliary converter 20 performs conversion between DC powers having different voltages, and in this case, is connected between two pairs of first-side terminals 5A of adjacent two DC/DC converters 10, to receive and pass power between the two pairs of first-side terminals 5A. For example, the auxiliary converter 20a is connected between the first-side terminals 5A of the DC/DC converter 10a and the first-side terminals 5A of the DC/DC converter 10b.

As described above, without limitation to connection between the adjacent DC/DC converters 10, each auxiliary converter 20 may be connected between the first-side terminals 5A of two DC/DC converters 10. By M-1 number of auxiliary converters 20 being connected between the DC/DC converters 10, the M number of DC/DC converters 10c to 10h can be balanced via the M-1 number of auxiliary converters 20.

Each auxiliary converter 20 has P terminals 25A connected to the first-side terminals 5A of the DC/DC converter 10 on the high-potential side, and N terminals 25B connected to the first-side terminals 5A of the DC/DC converter 10 on the low-potential side. The circuit configuration of each auxiliary converter 20 is the same as that of the DC/DC converter 10a, and has the same DC/AC conversion units 2, 3 and single-phase transformer 4 as those shown in FIG. 3.

The third control units 130 are provided for the respective auxiliary converters 20. For example, the third control unit 130a that controls the auxiliary converter 20a generates gate signals G20a for the semiconductor switching elements Q11 to Q24 in the auxiliary converter 20a, thereby controlling switching of each semiconductor switching element Q11 to Q24.

It is noted that, as shown in FIG. 2, the first DC terminals 100A and the second DC terminals 100B of the power conversion device 100, the first-side terminals 5A and the second-side terminals 5B of each DC/DC converter 10, and the P terminals 25A and the N terminals 25B of each auxiliary converter 20 are all composed of two positive and negative terminals. Here, unless otherwise specified, voltage between the positive and negative terminals is referred to as voltage of the terminals. For example, voltage of the P terminals 25A refers to voltage between the positive and negative terminals of the P terminals 25A.

As described above, the first-side terminals 5A of the M number of DC/DC converters 10a to 10h are connected so that common current flows between both positive and negative terminals of the first DC terminals 100A of the power conversion device 100, and the second-side terminals 5B of the DC/DC converters 10a to 10h are connected so that common current flows between both positive and negative terminals of the second DC terminals 100B of the power conversion device 100.

Therefore, input voltage Vin which is voltage of the first DC terminals 100A is the sum of voltages V1 (V1a to V1h) of the first-side terminals 5A of the DC/DC converters 10 (10a to 10h). In addition, output voltage Vout which is voltage of the second DC terminals 100B is the sum of voltages V2 (V2a to V2h) of the second-side terminals 5B of the DC/DC converters 10 (10a to 10h). Thus, input and output voltages of the power conversion device 100 can be represented by Expression (1) and Expression (2).

$$Vin = V1a + V1b + \ldots + V1h \quad (1)$$

$$Vout = V2a + V2b + \ldots + V2h \quad (2)$$

Control of the power conversion device 100 configured as described above will be described below, with reference to FIG. 4 to FIG. 6.

Figure 4:
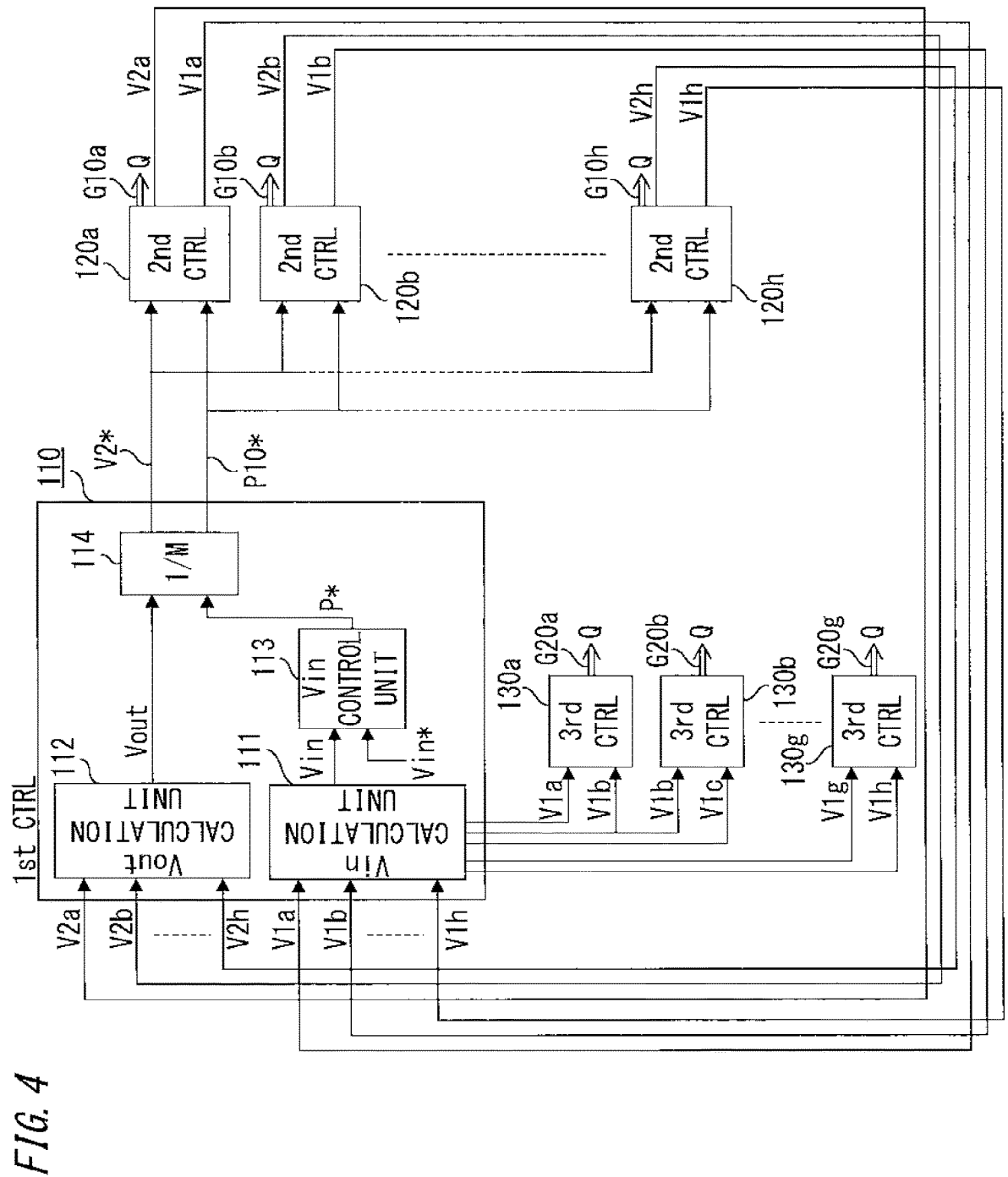
FIG. 4 is a block diagram showing the entire configuration of a controller of the power conversion device according to embodiment 1 of the present invention.

FIG. 4 is a block diagram showing the entire configuration of the controller of the power conversion device 100, i.e., the entire configuration including the first control unit 110 for controlling the entire main circuit, the second control units 120 (120a to 120h) for controlling the respective DC/DC converters 10, and the third control units 130 (130a to 130g) for controlling the respective auxiliary converters 20.

As shown in FIG. 4, each second control unit 120 (120a to 120h) has means for detecting input and output voltages V1 (V1a to V1h), V2 (V2a to V2h), and the detected input and output voltages V1, V2 are transmitted to the first control unit 110. The first control unit 110 transmits voltage V1 of the P terminals 25A and voltage V1 of the N terminals 25B of each auxiliary converter 20 to the respective third control units 130 (130a to 130g).

The first control unit 110 includes a Vin calculation unit 111, a Vout calculation unit 112, a Vin control unit 113, and an average value calculation unit 114. The Vin calculation unit 111 calculates input voltage Vin, using the above Expression (1), and the Vout calculation unit 112 calculates output voltage Vout, using the above Expression (2). The Vin control unit 113 receives given target voltage Vin* and the input voltage Vin, and generates a power command P* as a first command so that the input voltage Vin is controlled to be the target voltage Vin*, that is, the input voltage Vin approaches the target voltage Vin*. The average value calculation unit 114 receives the output voltage Vout and the power command P*, and divides them by the number M of the DC/DC converters 10a to 10h. Thus, command voltage V2* (=(Vout/M)) for voltage V2 of the second-side terminals 5B of each DC/DC converter 10, and a power command value P10* (=(P*/M)) used for control of each DC/DC converter 10, are generated. The first control unit 110 transmits the command voltage V2* and the power command value P10* to the second control unit 120 of each DC/DC converter 10.

Each second control unit 120 (120a to 120h) detects the input and output voltages V1 (V1a to V1h), V2 (V2a to V2h) and transmits them to the first control unit 110, and generates the gate signal G10 (G10a to G10h) for controlling each DC/DC converter 10, on the basis of the command voltage V2* and the power command value P10*.

Figure 5:
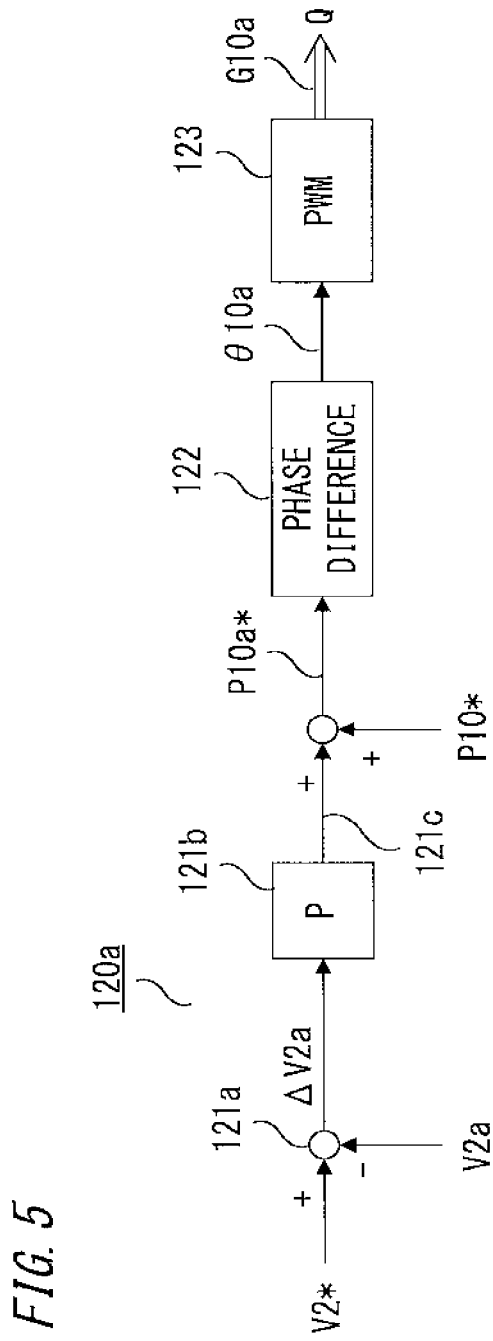
FIG. 5 is a control block diagram illustrating a second control unit for controlling the DC/DC converter according to embodiment 1 of the present invention.

FIG. 5 shows an example of a control block diagram illustrating the second control unit 120a for controlling the DC/DC converter 10a. It is noted that the second control units 120b to 120h are the same as the second control unit 120a.

As shown in FIG. 5, in the second control unit 120a, a subtractor 121a calculates a deviation ΔV2a between the command voltage V2* and the voltage V2a. A controller 121b calculates a first control command value 121c by, for example, proportional control so that the deviation ΔV2a approaches 0. The power command value P10* from the first control unit 110 is added to the first control command value 121c, whereby a control command P10a* for performing output control of the DC/DC converter 10a is generated.

A phase difference generator 122 outputs a difference θ10a between switching phases of the DC/AC conversion unit 2 and the DC/AC conversion unit 3 in the DC/DC converter 10a, on the basis of the control command P10a*. It is noted that output power is controlled by delaying the switching phase of the semiconductor switching elements Q21 to Q24 in the DC/AC conversion unit 3 on the secondary side by a predetermined phase difference θ [rad] relative to the switching phase of the semiconductor switching elements Q11 to Q14 in the DC/AC conversion unit 2 on the primary side.

A PWM signal generator 123 generates and outputs the gate signal G10a which is a PWM signal for performing switching control of each semiconductor switching element Q11 to Q24 in the DC/DC converter 10a, on the basis of the phase difference θ10a.

As shown in FIG. 4, each third control unit 130 (130a to 130g) generates the gate signal G20 (G20a to G20g) for controlling each auxiliary converter 20, on the basis of voltage V1 of the P terminals 25A and voltage V1 of the N terminals 25B of each auxiliary converter 20. For example, the third control unit 130a generates the gate signal G20a for controlling the auxiliary converter 20a, on the basis of voltage V1a of the P terminals 25A and voltage V1b of the N terminals 25B of the auxiliary converter 20a.

Figure 6:
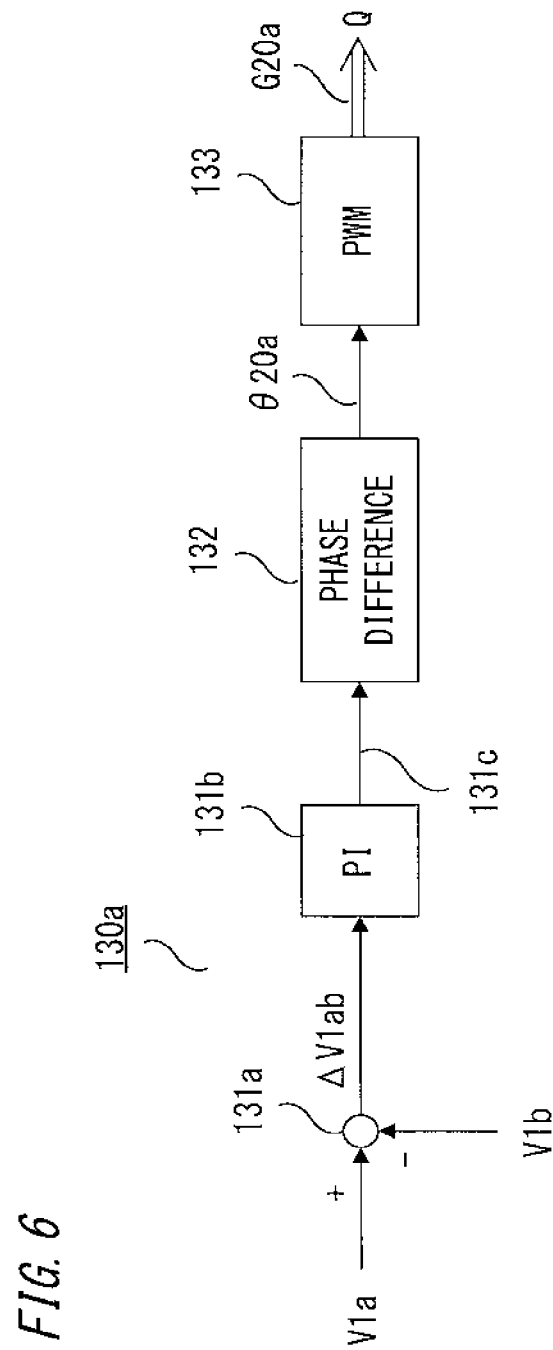
FIG. 6 is a control block diagram illustrating a third control unit for controlling an auxiliary converter according to embodiment 1 of the present invention.

FIG. 6 shows an example of a control block diagram illustrating the third control unit 130a for controlling the auxiliary converter 20a. It is noted that the third control units 130b to 130g are the same as the third control unit 130a.

As shown in FIG. 6, in the third control unit 130a, a subtractor 131a calculates a voltage difference ΔV1ab between voltage V1a of the P terminals 25A and voltage V1b of the N terminals 25B. A V1 controller 131b generates a power command (control command) 131c for performing output control of the auxiliary converter 20a, by, for example, proportional integral control so that the half of voltage difference ΔV1ab is compensated and voltage difference ΔV1ab approaches 0.

Here, a power transmission direction from the P terminals 25A to the N terminals 25B is defined as positive.

In the case of V1a>V1b, a positive power command 131c is generated so that the voltage V1a of the P terminals 25A approaches (V1a−(ΔV1ab/2)). At this time, DC power is transmitted from the P terminals 25A to the N terminals 25B, voltage V1a of the P terminals 25A gradually decreases, and voltage V1b of the N terminals 25B gradually increases, so that the voltage difference ΔV1ab between voltage V1a and voltage V1b decreases.

In the case of V1a<V1b, a negative power command 131c is generated so that voltage V1b of the N terminals 25B approaches (V1b−(ΔV1ab/2)). At this time, DC power is transmitted from the N terminals 25B to the P terminals 25A, voltage V1b of the N terminals 25B gradually decreases, and voltage V1a of the P terminals 25A gradually increases, so that the voltage difference ΔV1ab between voltage V1a and voltage V1b decreases.

A phase difference generator 132 outputs a difference θ20a between switching phases of the DC/AC conversion unit 2 and the DC/AC conversion unit 3 in the auxiliary converter 20a, on the basis of the power command 131c. A PWM signal generator 133 generates and outputs the gate signal G20a which is a PWM signal for performing switching control of each semiconductor switching element Q11 to Q24 in the auxiliary converter 20a, on the basis of the phase difference θ20a.

As described above, each auxiliary converter 20 is subjected to output control such that, on the basis of comparison between voltage V1 of the P terminals 25A and voltage V1 of the N terminals 25B, power is received and passed from the high-voltage side to the low-voltage side so as to equalize the two DC voltages. In this case, the third control unit 130a generates command voltage so that voltage of the terminals on the high-voltage side decreases by half the difference voltage, thereby controlling the corresponding auxiliary converter 20.

The P terminals 25A and the N terminals 25B of each auxiliary converter 20 are connected to the respective first-side terminals 5A of the two DC/DC converters 10, and two voltages of the first-side terminals 5A are controlled to be equalized by the auxiliary converter 20. Thus, voltages V1 (V1a to V1h) of the first-side terminals 5A of the M number of DC/DC converters 10 are controlled to be equalized.

As described above, the M number of DC/DC converters 10 and the M-1 number of auxiliary converters 20 are controlled by the first control unit 110, the second control units 120, and the third control units 130.

In each DC/DC converter 10, the second control unit 120 performs output control of the DC/DC converter 10 on the basis of the command voltage V2* for voltage V2 and the power command value P10*. The power command value P10* is calculated by dividing the power command P* for controlling the input voltage Vin of the entire power conversion device 100 to be the target voltage Vin*, by the number M of the DC/DC converters 10. Therefore, the DC/DC converters 10 operate so that each voltage V2 is controlled to be the command voltage V2* and the input voltage Vin of the entire power conversion device 100 is controlled to be the target voltage Vin*.

Each second control unit 120 causes the DC/DC converter 10 to operate so that the voltage V2 is controlled to be the command voltage V2*, and when the voltage V2 is determined, the voltage V1 is automatically determined in accordance with the power to be transmitted.

The DC/DC converters 10 have the same configuration, and each voltage V1 determined by operation thereof becomes, ideally, a value (Vin*/M) obtained by dividing the target voltage Vin* for input voltage Vin by the number M of the DC/DC converters 10. However, actually, error occurs by factors such as variation in components and detection error of detectors. Therefore, although the input voltage Vin which is the sum of voltages V1 can be controlled to be the target voltage Vin*, variation occurs among the voltages V1.

Through operations of the auxiliary converters 20, variation among voltages V1 is eliminated and the voltages V1 are controlled to be equalized.

It is noted that, since the target voltages for input voltage Vin and output voltage Vout of the power conversion device 100 are set as the power transmission system 1, the target voltages are controlled to be constant. Therefore, the step-up ratio (Vout/Vin) of the power conversion device 100 also becomes a constant value, and the input and output voltages V1, V2 of each DC/DC converter 10 becomes approximately constant values.

In the present embodiment, voltages of generated powers sent from the plurality of electric generators 210a, 201b via the power conditioners 220a, 220b are stepped up by the respective step-up DC/DC conversion units 230a, 230b and the resultant powers are collected together to be inputted to the power conversion device 100. The power conversion device 100 further steps up voltage of the inputted DC power and transmits the resultant power to the electrical substation 300.

The power conversion device 100 has a plurality of DC/DC converters 10 of which the input terminals (first-side terminals 5A) are connected so that common current flows between both positive and negative terminals of the input terminals (first DC terminals 100A) of the power conversion device 100 and the output terminals (second-side terminals 5B) are connected so that common current flows between both positive and negative terminals of the output terminals (second DC terminals 100B) of the power conversion device 100. Therefore, voltage assignment per one DC/DC converter 10 can be reduced. This enables application to high-voltage usage in which the input voltage Vin is equal to or higher than the withstand voltages of elements such as the semiconductor switching elements in the power conversion device 100. Each DC/DC converter 10, normally, further steps up the input voltage and outputs the resultant voltage, thus enabling output of DC power having further high voltage.

In addition, since the collected power obtained by collecting generated powers can be increased to be high voltage, it becomes possible to collect powers with high efficiency and over a long distance. The power conversion device 100 further steps up voltage of the inputted high-voltage DC power and transmits the resultant power, whereby the power transmission system 1 enables power transmission with high efficiency and over a long distance.

In addition, since the amount of power generation greatly varies in the wind power generation system 200 offshore, the input voltage Vin of the power conversion device 100 needs to be controlled to be constant by the power conversion device 100.

In the present embodiment, the auxiliary converters 20 are each provided between two DC/DC converters 10, on the input side.

The DC/DC converters 10 operate so that each voltage V2 on the output voltage Vout side is controlled to be the command voltage V2*, the input voltage Vin is controlled to be the target voltage Vin*, and each voltage V1 on the input voltage Vin side is automatically determined. Thus, through operations of the DC/DC converters 10, the voltages V2 are controlled to be equalized, and the input voltage Vin is controlled to be the target voltage Vin*. Then, through operations of the auxiliary converters 20, variation among the voltages V1 in the input voltage Vin is eliminated and the voltages V1 are controlled to be equalized.

Thus, the power conversion device 100 allows input of high-voltage DC power from a power source having varying voltage and can reliably perform output control, and the input voltages V1, the output voltages V2, and the power loads can be equalized among the DC/DC converters 10. Therefore, it becomes possible to reduce a margin provided in consideration of errors such as variation in components and detection errors of detectors, whereby size reduction and cost reduction of the power conversion device 100 can be achieved.

Each auxiliary converter 20 only has to transmit power corresponding to half the difference voltage between input voltages of two DC/DC converters 10. Therefore, the power capacity of the auxiliary converters 20 can be made smaller than that of the DC/DC converters 10. That is, the element capacity of the semiconductor switching elements Q in each auxiliary converter 20 can be reduced. It is noted that power received and passed by each auxiliary converter 20 is only transferred between the DC/DC converters 10 and therefore does not influence power transmitted by the power conversion device 100.

Each DC/DC converter 10 controls only one voltage V2 of the input and output voltages to be the command voltage V2*, and each auxiliary converter 20 controls only the high-voltage-side voltage which is one of the input and output voltages, to be the command voltage. Therefore, the DC/DC converters 10 and the auxiliary converters 20 can be realized with a simple configuration, whereby the size and the cost can be further reduced.

In the present embodiment, since the auxiliary converters 20 are provided on the input voltage side of the power conversion device 100, lower voltage is used as compared to the case where the auxiliary converters 20 are provided on the output voltage side as described later. Therefore, the capacities of elements such as the semiconductor switching elements Q in each auxiliary converter 20 can be reduced, whereby size reduction and cost reduction can be achieved.

In the above embodiment, means for detecting the input and output voltages V1, V2 of each DC/DC converter 10 is provided to each second control unit 120, but may be provided to the first control unit 110 or may be provided to both control units.

The input voltage Vin and the output voltage Vout of the power conversion device 100 are calculated by the first control unit 110. However, the first control unit 110 may have means for detecting the input voltage Vin and the output voltage Vout.

In the above embodiment, the controller has the first control unit 110, the second control units 120, and the third control units 130, and performs output control of the DC/DC converters 10 and the auxiliary converters 20, but the configuration is not limited thereto. In the case where each balancing circuit connected between two DC/DC converters 10 is not the auxiliary converter 20 for which switching control is performed, the controller is configured without the third control unit 130, and thus only the DC/DC converters 10 are control targets.

Embodiment 2

Next, embodiment 2 of the present invention will be described.

In the above embodiment 1, the auxiliary converters 20 are provided on the input voltage side of the power conversion device 100, whereas in the present embodiment, the auxiliary converters 20 are provided on the output voltage side. The configuration of the power transmission system 1 is the same as that described in FIG. 1 in the above embodiment 1.

Figure 7:
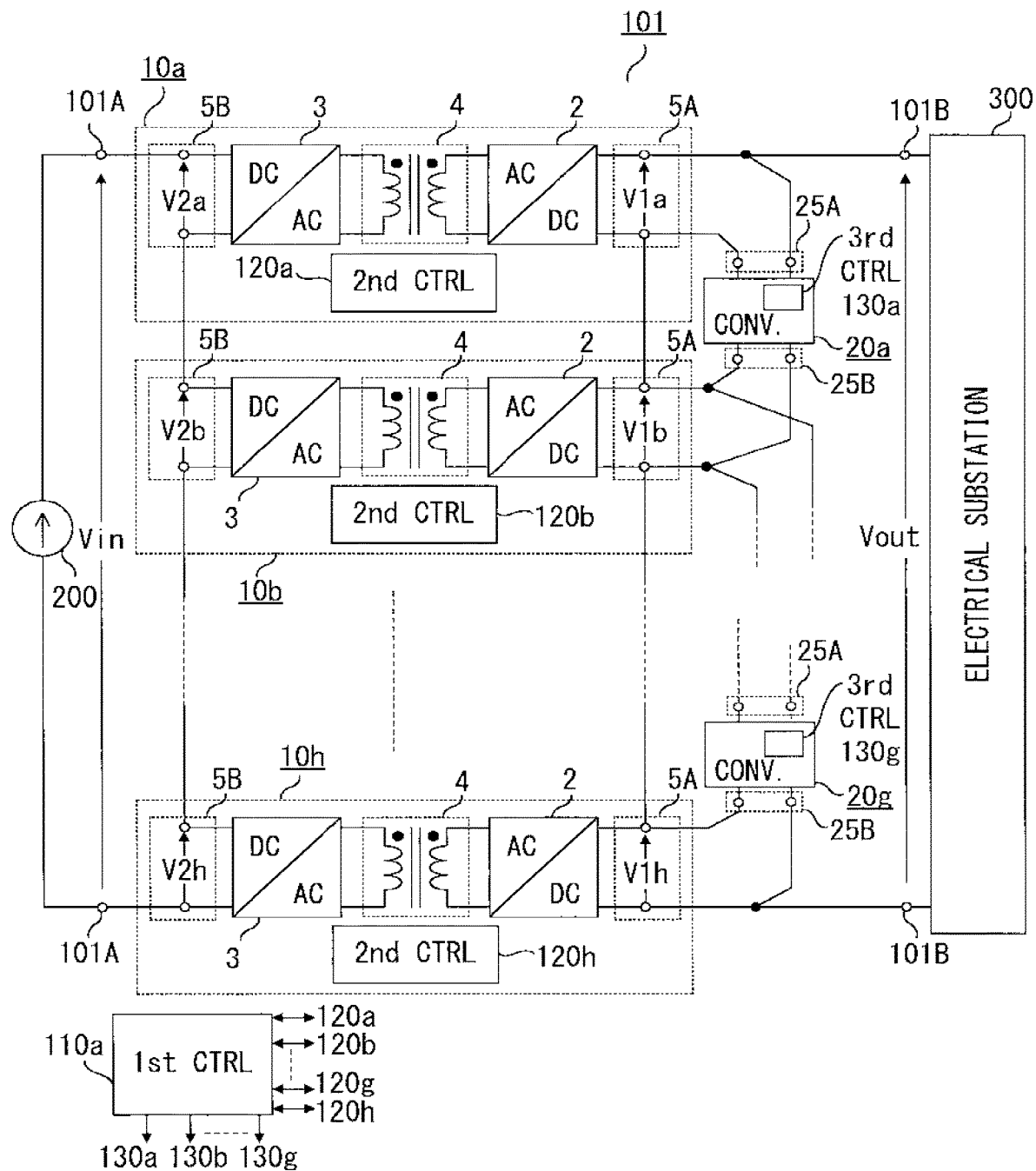
FIG. 7 is a diagram showing the configuration of a power conversion device according to embodiment 2 of the present invention.

FIG. 7 is a diagram showing the configuration of a power conversion device 101 according to the present embodiment 2.

As shown in FIG. 7, the power conversion device 101 has first DC terminals 101B and second DC terminals 101A each pair of which is composed of both positive and negative terminals. In the present embodiment 2, DC power from the wind power generation system 200 is inputted to the second DC terminals 101A. That is, the second DC terminals 101A serve as the input terminals of the main circuit (power conversion unit) of the power conversion device 101, and the input voltage Vin is voltage of the second DC terminals 101A. In addition, the first DC terminals 101B serve as the output terminals of the main circuit of the power conversion device 101, and the output voltage Vout is voltage of the first DC terminals 101B.

The power conversion device 101 includes, between the input terminals (second DC terminals 101A) and the output terminals (first DC terminals 101B), a plurality (M number) of DC/DC converters 10 (10a to 10h) and M-1 number of auxiliary converters 20 (20a to 20g).

In addition, the power conversion device 101 includes a controller for performing output control of the DC/DC converters 10 and the auxiliary converters 20 of the main circuit. The controller includes: a first control unit 110a for controlling the entire main circuit; second control units 120 (120a to 120h) for controlling the respective DC/DC converters 10; and third control units 130 (130a to 130g) for controlling the respective auxiliary converters 20.

Each DC/DC converter 10 includes: DC terminals 5A (first-side terminals 5A) on the secondary side as the first side; DC terminals 5B (second-side terminals 5B) on the primary side as the second side; a DC/AC conversion unit 2 on the first side; a DC/AC conversion unit 3 on the second side; and a single-phase transformer 4. The circuit configuration of each DC/DC converter 10 is the same as that shown in FIG. 3 in the above embodiment 1, but in the present embodiment 2, the input/output relationship between the first-side terminals 5A and the second-side terminals 5B is reversed. It is noted that the circuit of each DC/DC converter 10 is right-left symmetric and thus is capable of bidirectional operations, and therefore, merely the first side and the second side as the terms for input and output sides are reversed.

The second control units 120 are provided for the respective DC/DC converters 10.

The first-side terminals 5A of the M number of DC/DC converters 10a to 10h are connected so that common current flows between both positive and negative terminals of the first DC terminals 101B of the power conversion device 101, and the second-side terminals 5B of the DC/DC converters 10a to 10h are connected so that common current flows between both positive and negative terminals of the second DC terminals 101A of the power conversion device 101.

Each auxiliary converter 20 performs conversion between DC powers having different voltages, and is connected between two pairs of first-side terminals 5A of two DC/DC converters 10, to receive and pass power between the two pairs of first-side terminals 5A.

Each auxiliary converter 20 has P terminals 25A connected to the first-side terminals 5A of the DC/DC converter 10 on the high-potential side, and N terminals 25B connected to the first-side terminals 5A of the DC/DC converter 10 on the low-potential side. The circuit configuration of each auxiliary converter 20 is the same as that of the DC/DC converter 10a, and has the same DC/AC conversion units 2, 3 and single-phase transformer 4 as those shown in FIG. 3.

The third control units 130 are provided for the respective auxiliary converters 20.

As described above, the first-side terminals 5A of the M number of DC/DC converters 10a to 10h are connected so that common current flows between both positive and negative terminals of the first DC terminals 101B of the power conversion device 101, and the second-side terminals 5B thereof are connected so that common current flows between both positive and negative terminals of the second DC terminals 101A of the power conversion device 101.

Therefore, input voltage Vin which is voltage of the second DC terminals 101A is the sum of voltages V2 (V2a to V2h) of the second-side terminals 5B of the DC/DC converters 10 (10a to 10h). In addition, output voltage Vout which is voltage of the first DC terminals 101B is the sum of voltages V1 (V1a to V1h) of the first-side terminals 5A of the DC/DC converters 10 (10a to 10h). Thus, input and output voltages of the power conversion device 101 can be represented by Expression (3) and Expression (4).

$$Vin = V2a + V2b + \ldots + V2h \quad (3)$$

$$Vout = V1a + V1b + \ldots + V1h \quad (4)$$

Control of the power conversion device 101 configured as described above will be described below, with reference to FIG. 8.

Figure 8:
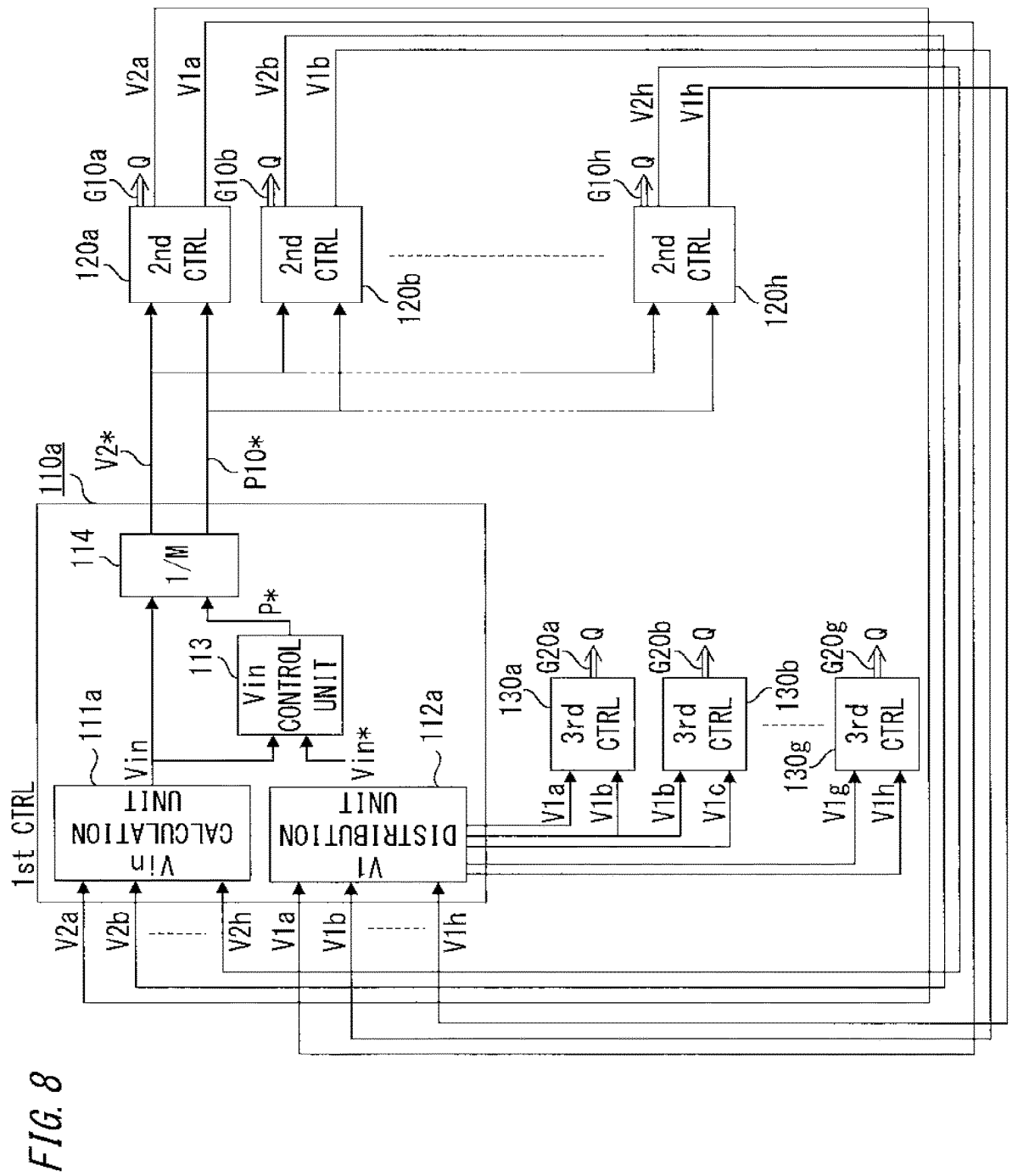
FIG. 8 is a block diagram showing the entire configuration of a controller of the power conversion device according to embodiment 2 of the present invention.

FIG. 8 is a block diagram showing the entire configuration of the controller of the power conversion device 101, i.e., the entire configuration including the first control unit 110a for controlling the entire main circuit, the second control units 120 (120a to 120h) for controlling the respective DC/DC converters 10, and the third control units 130 (130a to 130g) for controlling the respective auxiliary converters 20.

As shown in FIG. 8, each second control unit 120 (120a to 120h) has means for detecting input and output voltages V2 (V2a to V2h), V1 (V1a to V1h), and the detected input and output voltages V2, V1 are transmitted to the first control unit 110a. The first control unit 110a transmits voltage V1 of the P terminals 25A and voltage V1 of the N terminals 25B of each auxiliary converter 20 to the respective third control units 130 (130a to 130g).

The first control unit 110a includes a Vin calculation unit 111a, a V1 distribution unit 112a, a Vin control unit 113, and an average value calculation unit 114. The V1 distribution unit 112a transmits voltages V1 of the P terminals 25A and the N terminals 25B of the auxiliary converters 20 to the respective third control units 130. The Vin calculation unit 111a calculates input voltage Vin, using the above Expression (3). The Vin control unit 113 receives given target voltage Vin* and the input voltage Vin, and generates a power command P* as a first command so that the input voltage Vin is controlled to be the target voltage Vin*, that is, the input voltage Vin approaches the target voltage Vin*. The average value calculation unit 114 receives the input voltage Vin and the power command P*, and divides them by the number M of the DC/DC converters 10a to 10h. Thus, command voltage V2* (=(Vout/M)) for voltage V2 of the second-side terminals 5B of each DC/DC converter 10, and a power command value P10* (=(P*/M)) used for control of each DC/DC converter 10, are generated. The first control unit 110a transmits the command voltage V2* and the power command value P10* to the second control unit 120 of each DC/DC converter 10.

Each second control unit 120 (120a to 120h) detects the input and output voltages V2 (V2a to V2h), V1 (V1a to V1h) and transmits them to the first control unit 110a, and generates the gate signal G10 (G10a to G10h) for controlling each DC/DC converter 10, on the basis of the command voltage V2* and the power command value P10*.

For example, the second control unit 120a that controls the DC/DC converter 10a will be described below. As in the above embodiment 1 shown in FIG. 5, in the second control unit 120a, a subtractor 121a calculates a deviation ΔV2a between the command voltage V2* and the voltage V2a. A controller 121b calculates a first control command value 121c by, for example, proportional control so that the deviation ΔV2a approaches 0. The power command value P10* from the first control unit 110a is added to the first control command value 121c, whereby a control command P10a* for performing output control of the DC/DC converter 10a is generated.

A phase difference generator 122 outputs a difference θ10a between switching phases of the DC/AC conversion unit 2 and the DC/AC conversion unit 3 in the DC/DC converter 10a, on the basis of the control command P10a*. Then, a PWM signal generator 123 generates and outputs the gate signal G10a which is a PWM signal for performing switching control of each semiconductor switching element Q11 to Q24 in the DC/DC converter 10a, on the basis of the phase difference θ10a.

Each third control unit 130 (130a to 130g) generates the gate signal G20 (G20a to G20g) for controlling each auxiliary converter 20, on the basis of voltage V1 of the P terminals 25A and voltage V1 of the N terminals 25B of each auxiliary converter 20. For example, the third control unit 130a generates the gate signal G20a for controlling the auxiliary converter 20a, on the basis of voltage V1a of the P terminals 25A and voltage V1b of the N terminals 25B of the auxiliary converter 20a.

The third control unit 130 is the same as in the above embodiment 1, and each auxiliary converter 20 is subjected to output control such that, on the basis of comparison between voltage V1 of the P terminals 25A and voltage V1 of the N terminals 25B, power is received and passed from the high-voltage side to the low-voltage side so as to equalize the two DC voltages.

In the above embodiment 1, voltage V2 controlled by each DC/DC converter 10 is output voltage, whereas in the present embodiment 2, voltage V2 is input voltage. However, each voltage V2 and the input voltage Vin of the power conversion device 101 can be controlled in the same manner as in the above embodiment 1.

That is, in each DC/DC converter 10, the second control unit 120 performs output control of the DC/DC converter 10 on the basis of the command voltage V2* for voltage V2 and the power command value P10*. The power command value P10* is calculated by dividing the power command P* for controlling the input voltage Vin of the entire power conversion device 101 to be the target voltage Vin*, by the number M of the DC/DC converters 10. Therefore, the DC/DC converters 10 operate so that each voltage V2 is controlled to be the command voltage V2* and the input voltage Vin of the entire power conversion device 101 is controlled to be the target voltage Vin*.

Each second control unit 120 causes the DC/DC converter 10 to operate so that the voltage V2 is controlled to be the command voltage V2*, and when the voltage V2 is determined, the voltage V1 is automatically determined in accordance with the power to be transmitted.

The DC/DC converters 10 have the same configuration, and the voltage V1 determined by operation thereof becomes, ideally, a value (Vout/M) obtained by dividing the output voltage Vout by the number M of the DC/DC converters 10. However, actually, error occurs by factors such as variation in components and detection error of detectors. Therefore, variation occurs among the voltages V1.

Through operations of the auxiliary converters 20, variation among voltages V1 is eliminated and the voltages V1 are controlled to be equalized.

Also in the present embodiment 2, since the power conversion device 101 is configured with a plurality of DC/DC converters 10 connected, voltage assignment per one DC/DC converter 10 can be reduced, and the input voltage Vin can be increased to be high voltage.

The auxiliary converters 20 are each provided between two DC/DC converters 10, on the output side, thus enabling control of both input and output voltages of each DC/DC converter 10. Therefore, as in the above embodiment 1, the power conversion device 101 allows input of high-voltage DC power from a power source having varying voltage and can reliably perform output control, and the input voltages V1, the output voltages V2, and the power loads can be equalized among the DC/DC converters 10. Therefore, it becomes possible to reduce a margin provided in consideration of errors such as variation in components and detection errors of detectors, whereby size reduction and cost reduction of the power conversion device 101 can be achieved.

Each auxiliary converter 20 only has to transmit power corresponding to half the difference voltage between input voltages of two DC/DC converters 10. Therefore, the power capacity of the auxiliary converters 20 can be made smaller than that of the DC/DC converters 10.

Each DC/DC converter 10 controls only one voltage V2 of the input and output voltages to be the command voltage V2*, and each auxiliary converter 20 controls only the high-voltage-side voltage which is one of the input and output voltages, to be the command voltage. Therefore, the DC/DC converters 10 and the auxiliary converters 20 can be realized with a simple configuration, whereby the size and the cost can be further reduced.

Embodiment 3

Next, embodiment 3 of the present invention will be described.

In the present embodiment 3, each DC/DC converter 10 shown in the above embodiment 1 is configured by connecting a plurality (N number) of converter cells 30 (30a to 30x). Also in this case, the controller of the power conversion device 100 includes: a first control unit 110 for controlling the entire main circuit; second control units 120 (120a to 120h) for controlling the respective DC/DC converters 10; and third control units 130 (130a to 130g) for controlling the respective auxiliary converters 20. Each second control unit 120 includes a control unit for the DC/DC converter 10 and cell control units 140 for controlling the respective converter cells 30.

The configurations other than the DC/DC converter 10 and the second control unit 120 are the same as in the above embodiment 1.

Figure 9:
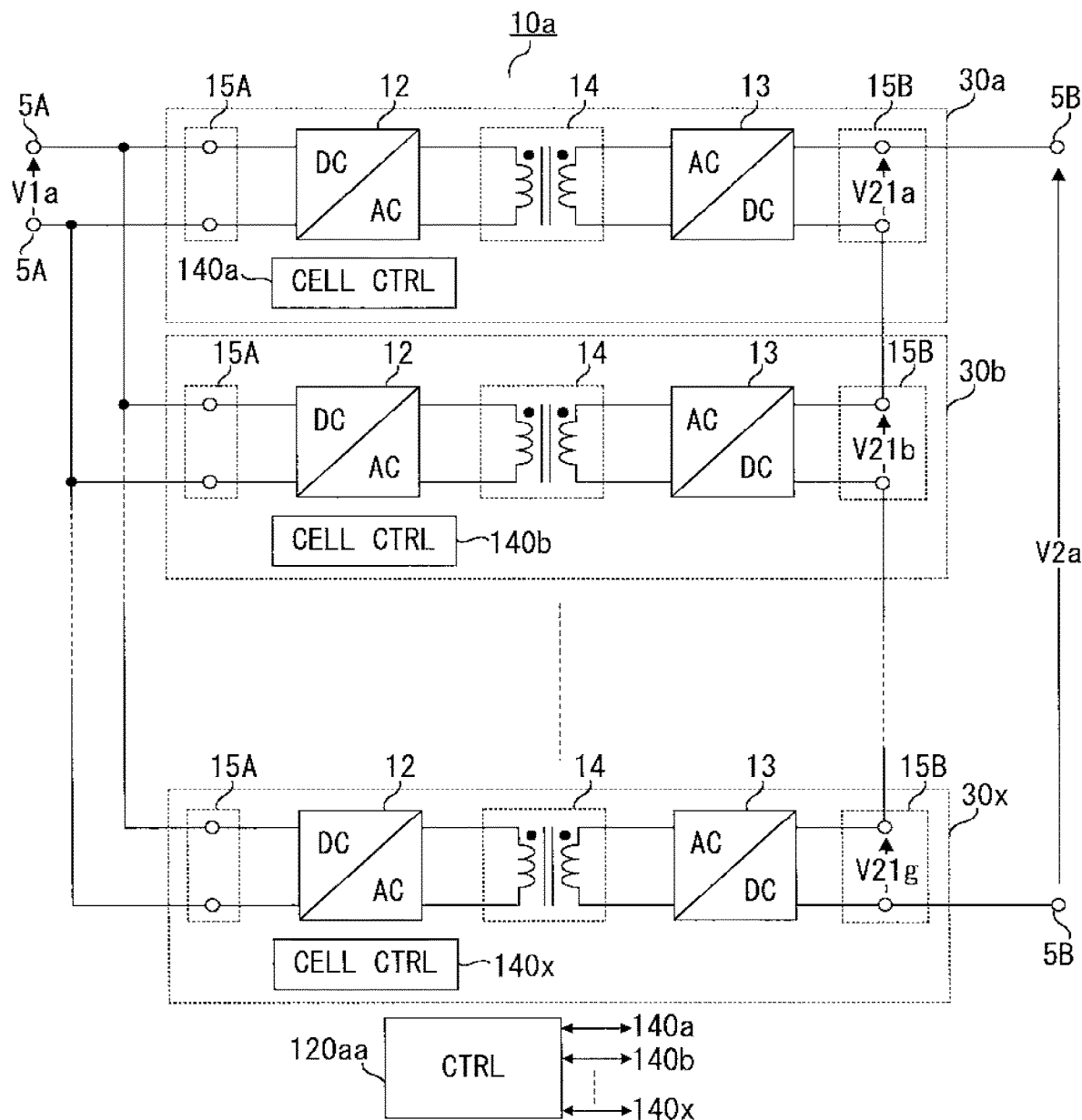
FIG. 9 is a diagram showing the configuration of a DC/DC converter according to embodiment 3 of the present invention.

FIG. 9 shows an example of a circuit diagram of the DC/DC converter 10a according to the present embodiment 3. It is noted that the other DC/DC converters 10b to 10h are the same as the DC/DC converter 10a.

As shown in FIG. 9, the DC/DC converter 10a includes a plurality of converter cells 30 (30a to 30x) between the first-side terminals 5A and the second-side terminals 5B.

Figure 10:
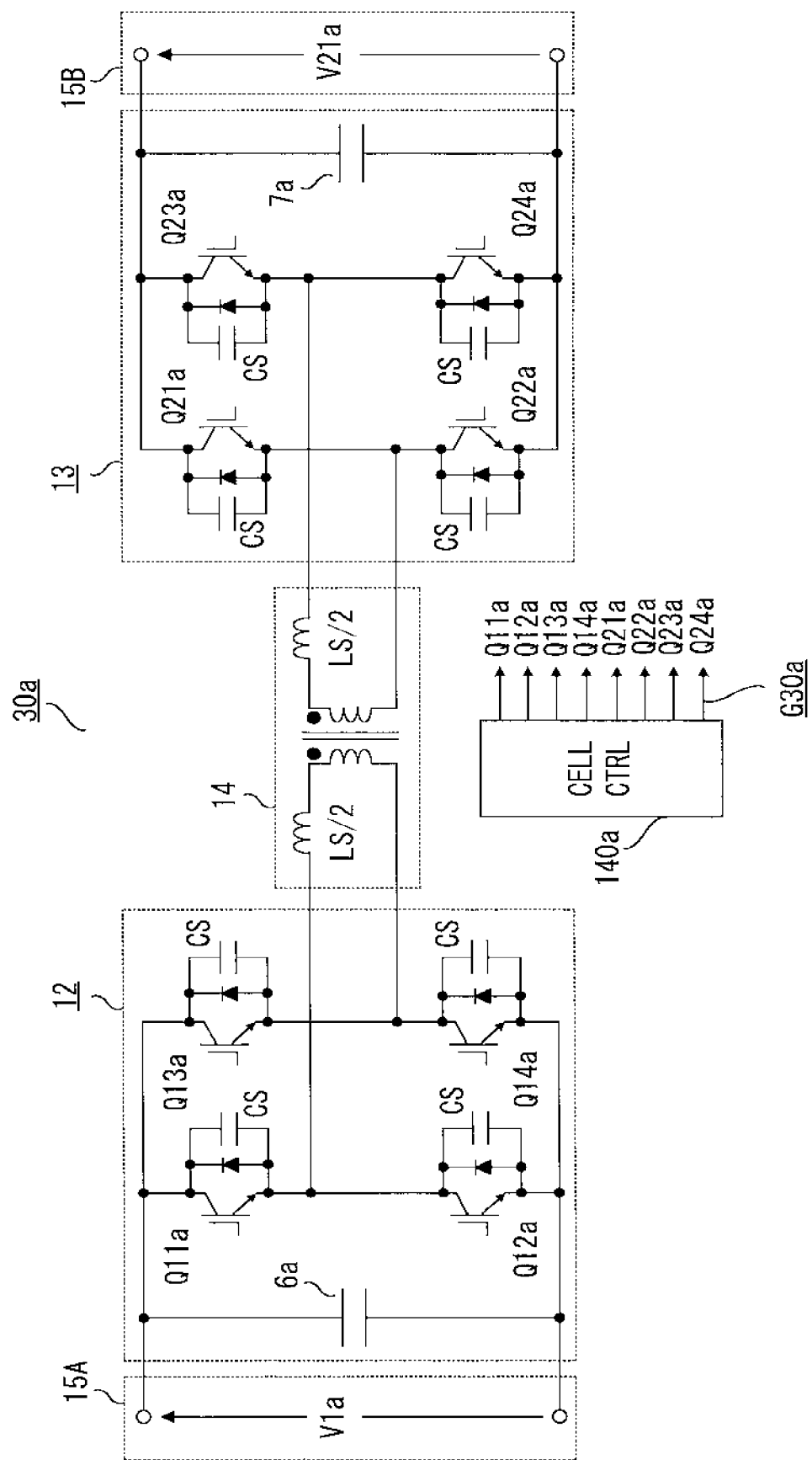
FIG. 10 is a circuit diagram of a converter cell according to embodiment 3 of the present invention.
Figure 11:
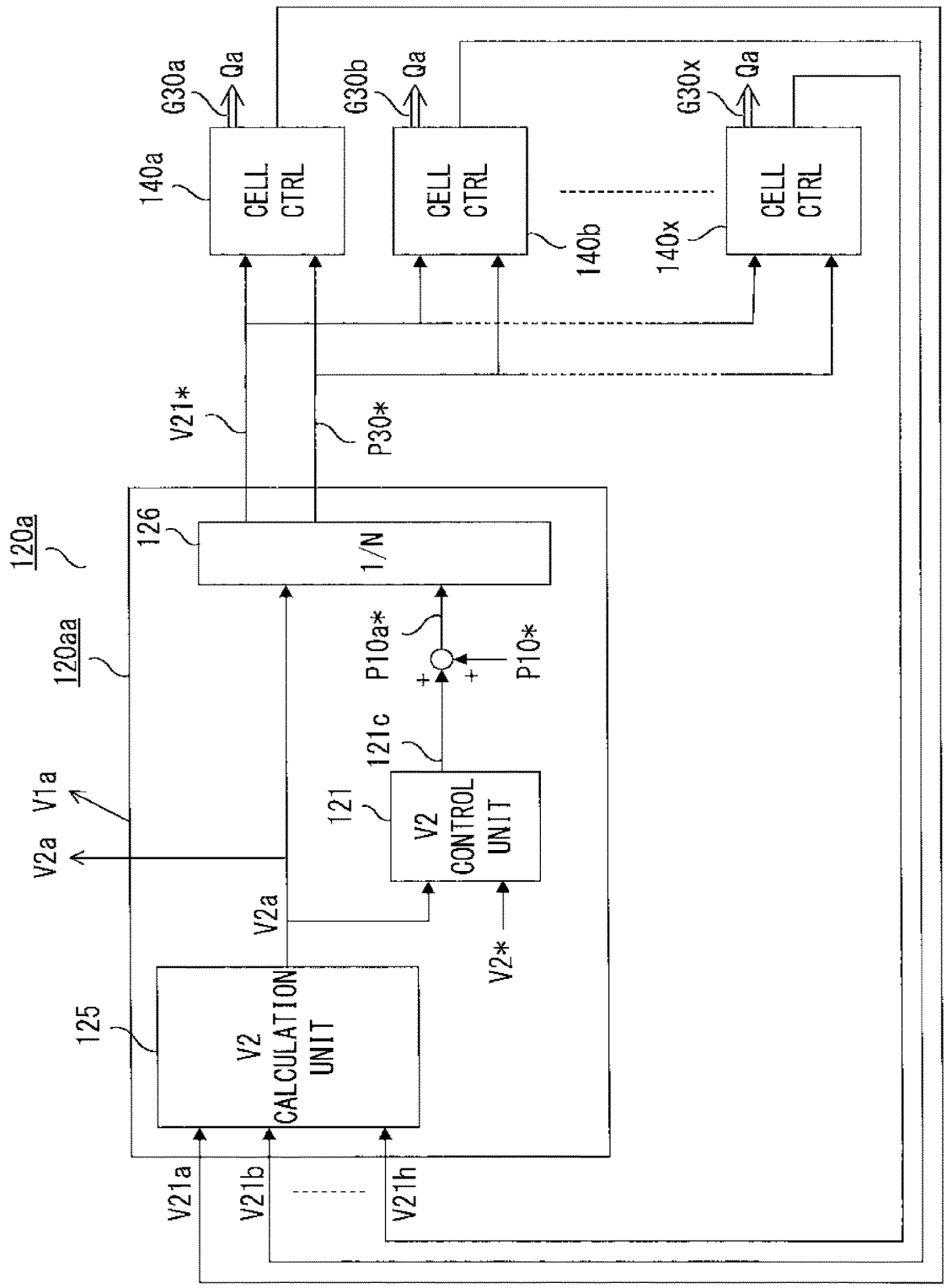
FIG. 11 is a block diagram showing the entire configuration of a second control unit for controlling the DC/DC converter according to embodiment 3 of the present invention.

FIG. 10 shows an example of a circuit diagram of the converter cell 30a, and FIG. 11 shows the second control unit 120a for controlling the DC/DC converter 10a.

In this case, the second control unit 120a for controlling the DC/DC converter 10a is composed of a control unit 120aa for controlling the entire circuit of the DC/DC converter 10a, and the cell control units 140 (140a to 140x) for controlling the respective converter cells 30 (30a to 30x).

Each converter cell 30 includes, between primary-side DC terminals 15A as A terminals and secondary-side DC terminals 15B as B terminals, a DC/AC conversion unit 12 on the primary side, a DC/AC conversion unit 13 on the secondary side, and a single-phase transformer 14. The cell control units 140 are provided for the respective converter cells 30.

Regarding the plurality of converter cells 30 (30a to 30x) in the DC/DC converter 10a, the DC terminals 15A on the primary side are connected in parallel to the first-side terminals 5A of the DC/DC converter 10a, and the DC terminals 15B on the secondary side are connected so that common current flows between both poles of the second-side terminals 5B of the DC/DC converter 10a. That is, the input sides of the plurality of converter cells 30 composing the DC/DC converter 10a are connected in parallel and the output sides thereof are connected so that common current flows.

The converter cell 30a is configured as shown in FIG. 10. It is noted that there are various types of converter cells as the converter cells 30, and an appropriate type is selected in accordance with, for example, rated voltage, conversion capacity, operation frequency, and the like. The other converter cells 30b to 30x are the same as the converter cell 30a. It is noted that, in this case, the circuit configuration of the converter cell 30a is the same as that of the DC/DC converter 10a shown in FIG. 3 in the above embodiment 1.

As shown in FIG. 10, the DC/AC conversion unit 12 on the primary side includes: a DC capacitor 6a connected between both poles of the DC terminals 15A; and a first full-bridge circuit formed by two switching legs composed of semiconductor switching elements Q11a to Q14a as positive-side and negative-side semiconductor elements connected in series. The DC/AC conversion unit 13 on the secondary side includes: a DC capacitor 7a connected between both poles of the DC terminals 15B; and a second full-bridge circuit formed by two switching legs composed of semiconductor switching elements Q21a to Q24a as positive-side and negative-side semiconductor elements connected in series. The single-phase transformer 14 as a transformer is connected between intermediate connection points of the switching legs of the DC/AC conversion unit 12 and intermediate connection points of the switching legs of the DC/AC conversion unit 13. It is noted that, if insulation is not needed, only inductance LS may be connected instead of the single-phase transformer 14.

As the semiconductor switching elements Q11a to Q24a, for example, semiconductor switching elements having a self-turn-off function, such as IGBTs, to which diodes are connected in antiparallel are used. Each semiconductor switching element Q11a to Q24a may be used with a plurality of semiconductor switching elements combined in parallel, depending on the current capacity.

In this case, a snubber capacitor CS is connected in parallel to each semiconductor switching element Q11a to Q24a. Owing to effects of the snubber capacitor CS and the inductance LS of the AC output line, zero voltage switching which is soft switching of each semiconductor switching element Q11a to Q24a becomes possible.

The cell control unit 140a generates gate signals G30a for the semiconductor switching elements Q11a to Q24a in the converter cell 30a, thereby controlling switching of the semiconductor switching elements Q11a to Q24a.

In this case, by soft switching of the semiconductor switching elements Q11a to Q24a, switching loss can be reduced, the operation frequency can be increased, and the size of the single-phase transformer 14 can be reduced.

In the converter cell 30a, since the DC terminals 15A are connected in parallel to the first-side terminals 5A of the DC/DC converter 10a, the DC voltage V1a applied to the first-side terminals 5A is applied to the DC terminals 15A. Further, the converter cell 30a is a circuit that converts the DC voltage V1a to DC voltage V21a applied to the DC terminals 15B, via the DC/AC conversion unit 12, the single-phase transformer 14, and the DC/AC conversion unit 13, and can be freely controlled so as to perform bidirectional power conversion. It is desirable that the turns ratio of the single-phase transformer 14 is matched with the ratio of the DC voltage V1a on the primary side and the DC voltage V21a on the secondary side.

It is noted that the DC/DC converter 10a composed of the plurality of converter cells 30, in normal operation, steps up the primary-side voltage V1a and outputs the secondary-side voltage V21a, but the operation of each converter cell 30 is not limited to step-up operation.

As the DC capacitors 6a, 7a, electrolytic capacitors, film capacitors, or the like are used. High-frequency current flows through the DC capacitors 6a, 7a, but in the case of using film capacitors, deterioration due to the high-frequency current can be suppressed and thus the life of the capacitors is prolonged.

As described above, the DC terminals 15B of the N number of converter cells 30a to 30x in the DC/DC converter 10a are connected so that common current flows between both positive and negative terminals of the second-side terminals 5B of the DC/DC converter 10a.

Therefore, voltage V2a of the second-side terminals 5B of the DC/DC converter 10a is the sum of voltages V21 (V21a to V21x) of the DC terminals 15B on the output side of the converter cells 30 (30a to 30x). Thus, voltage V2a of the second-side terminals 5B which is output voltage of the DC/DC converter 10a is represented by Expression (5).

$$V2a = V21a + V21b + \ldots + V21x \tag{5}$$

Control of the DC/DC converter 10a configured as described above will be described below.

As shown in FIG. 11, the control unit 120aa detects input and output voltages V1a, V2a of the DC/DC converter 10a, and transmits them to the first control unit 110 (not shown). It is noted that the detection of voltage V2a is performed through calculation as described later. Each cell control unit 140 has means for detecting voltage V21 (V21a to V21x) of the DC terminals 15B which is output voltage of each converter cell 30, and transmits the detected voltage V21 to the control unit 120aa.

In addition, as in the above embodiment 1, the command voltage V2* (=(Vout/M)) and the power command value P10* (=(P*/M)) are generated by the first control unit 110, and are transmitted to the second control units 120 of the respective DC/DC converters 10. In the second control unit 120a, the received command voltage V2* and power command value P10* are inputted to the control unit 120aa.

The control unit 120aa includes a V2 control unit 121, a V2 calculation unit 125, and an average value calculation unit 126. The V2 calculation unit 125 calculates voltage V2a using the above Expression (5) on the basis of the voltages V21 received from the cell control units 140. The V2 control unit 121 receives the command voltage V2* from the first control unit 110 and the voltage V2a, and calculates a first control command value 121c so that the voltage V2a approaches the command voltage V2*. The power command value P10* from the first control unit 110 is added to the first control command value 121c, whereby a control command P10a* for performing output control of the DC/DC converter 10a is generated.

The average value calculation unit 126 receives the voltage V2a and the control command P10a* and divides them by the number N of the converter cells 30a to 30x. Thus, command voltage V21* (=(V2a/N)) which is B voltage for voltage V21 of the DC terminals 15B of each converter cell 30, and a power command value P30* (=(P10a*/N)) as a second control command value used for control of each converter cell 30, are generated. Then, the control unit 120aa transmits the command voltage V21* and the power command value P30* to the cell control unit 140 of each converter cell 30.

Each cell control unit 140 (140a to 140x) generates the gate signal G30 (G30a to G30x) for controlling each converter cell 30, on the basis of the command voltage V21* and the power command value P30*.

Next, the entire control of the power conversion device 100 according to the present embodiment 3 will be described below, with reference to FIG. 12 to FIG. 16.

Figure 12:
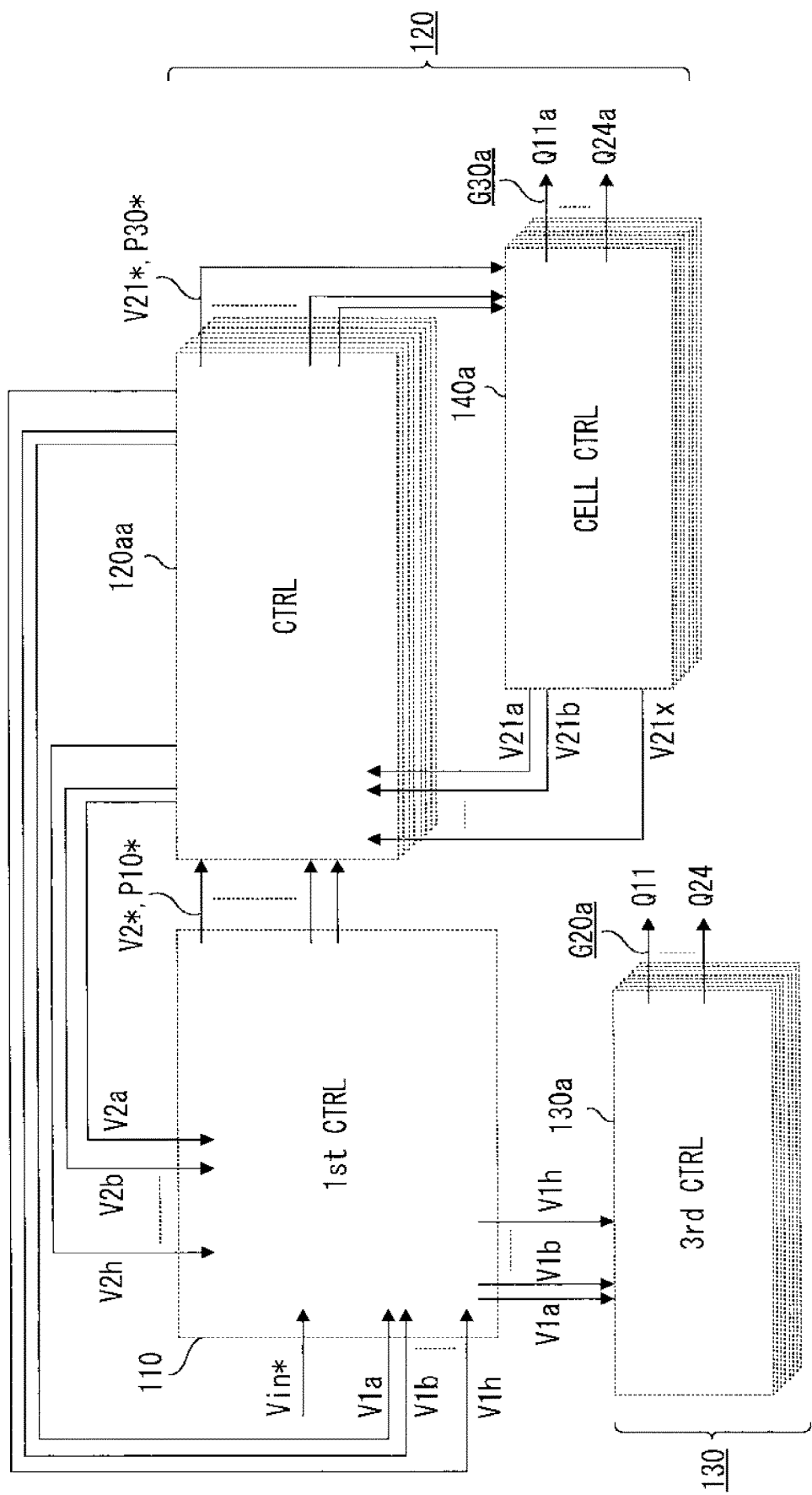
FIG. 12 is a block diagram showing the entire configuration of a controller of the power conversion device according to embodiment 3 of the present invention.

FIG. 12 is a block diagram showing the entire configuration of the controller of the power conversion device 100, i.e., the entire configuration including the first control unit 110 for controlling the entire main circuit, the second control units 120 (120a to 120h) for controlling the respective DC/DC converters 10, and the third control units 130 (130a to 130g) for controlling the respective auxiliary converters 20. Each second control unit 120 includes the control unit 120aa for controlling the entire circuit of the corresponding DC/DC converter 10, and the cell control units 140 (140a to 140x) for controlling the N number of converter cells 30 in the DC/DC converter 10.

Figure 13:
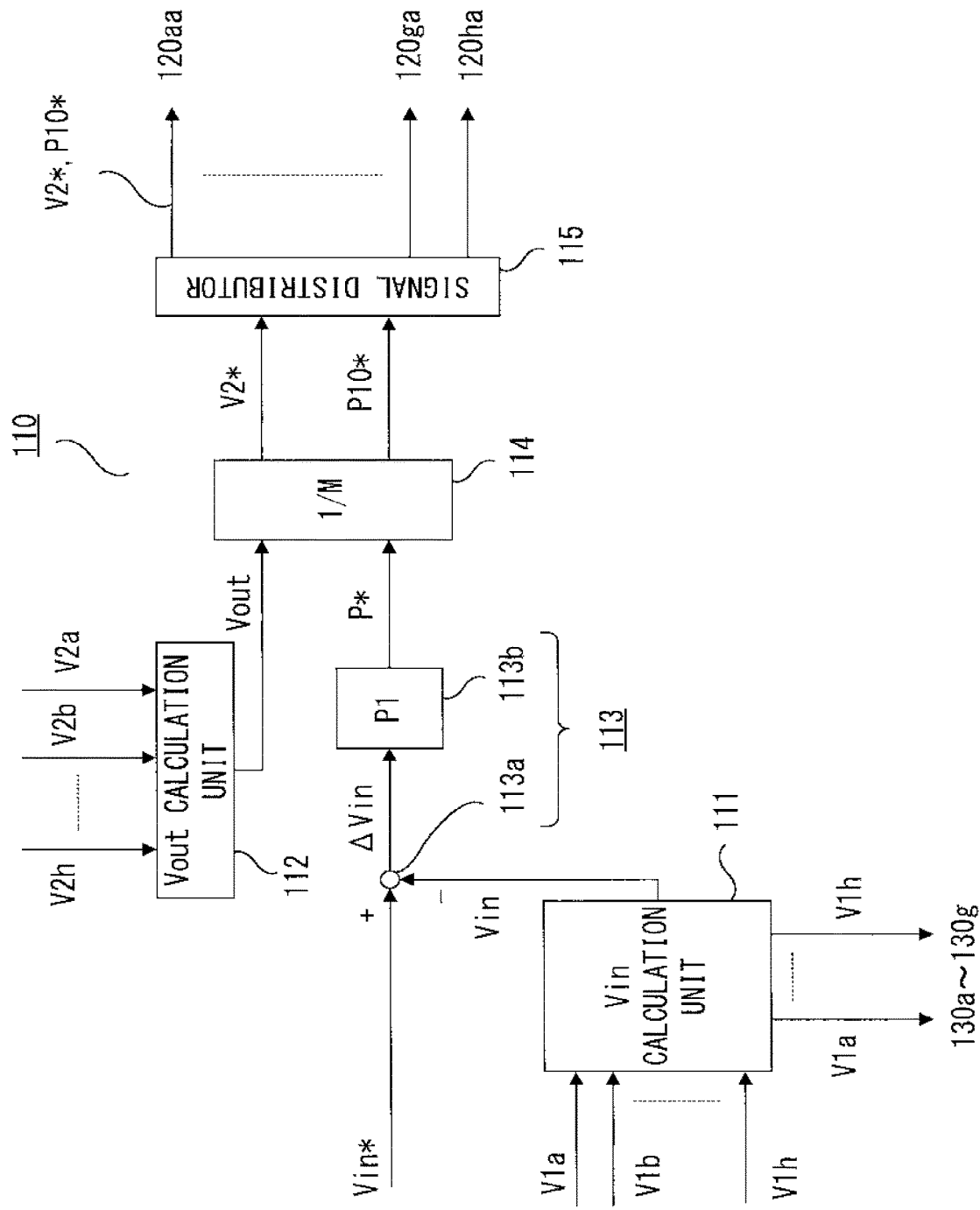
FIG. 13 is a control block diagram illustrating a first control unit for controlling the power conversion unit according to embodiment 3 of the present invention.
Figure 14:
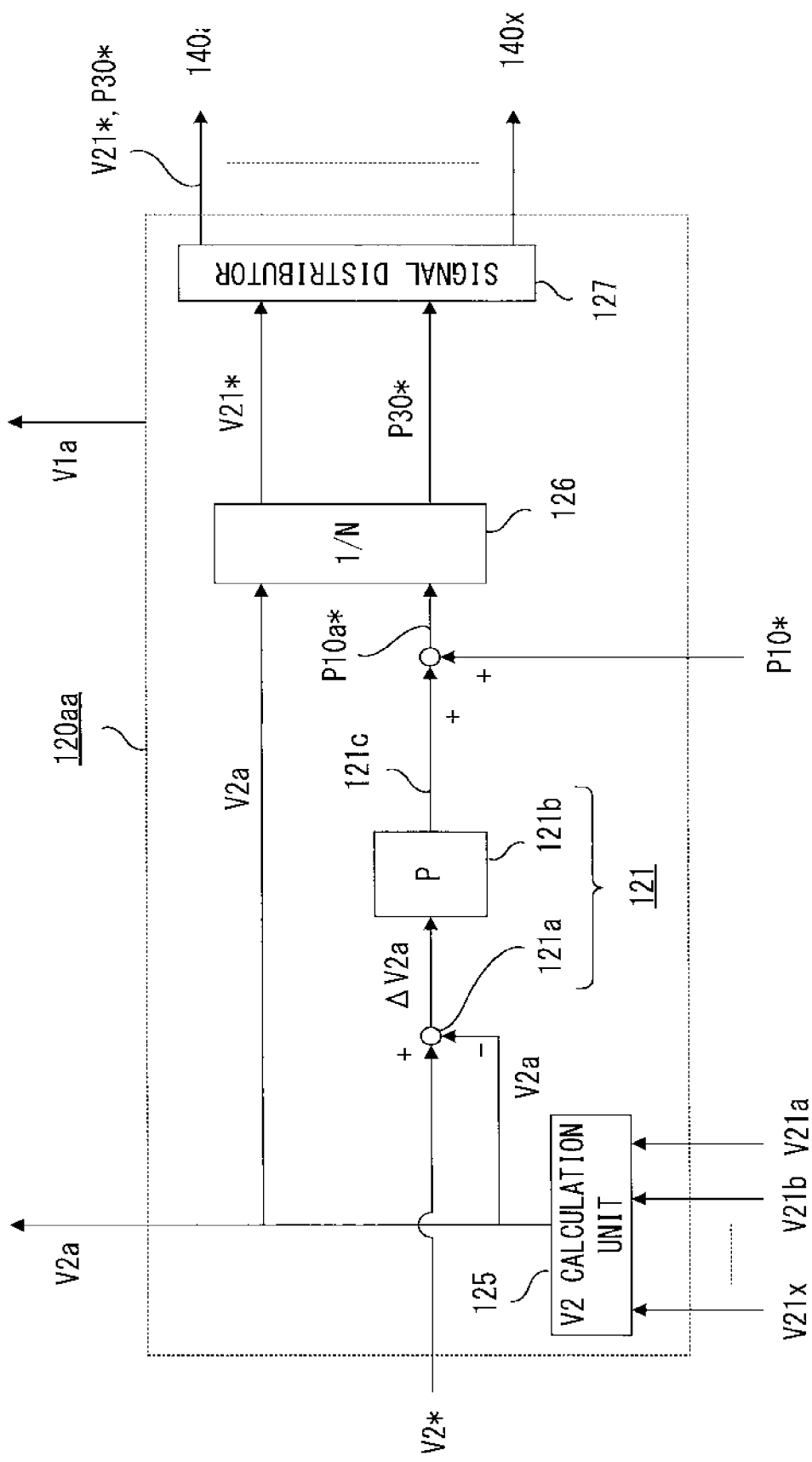
FIG. 14 is a control block diagram illustrating control for the entire DC/DC converter, in the second control unit according to embodiment 3 of the present invention.
Figure 15:
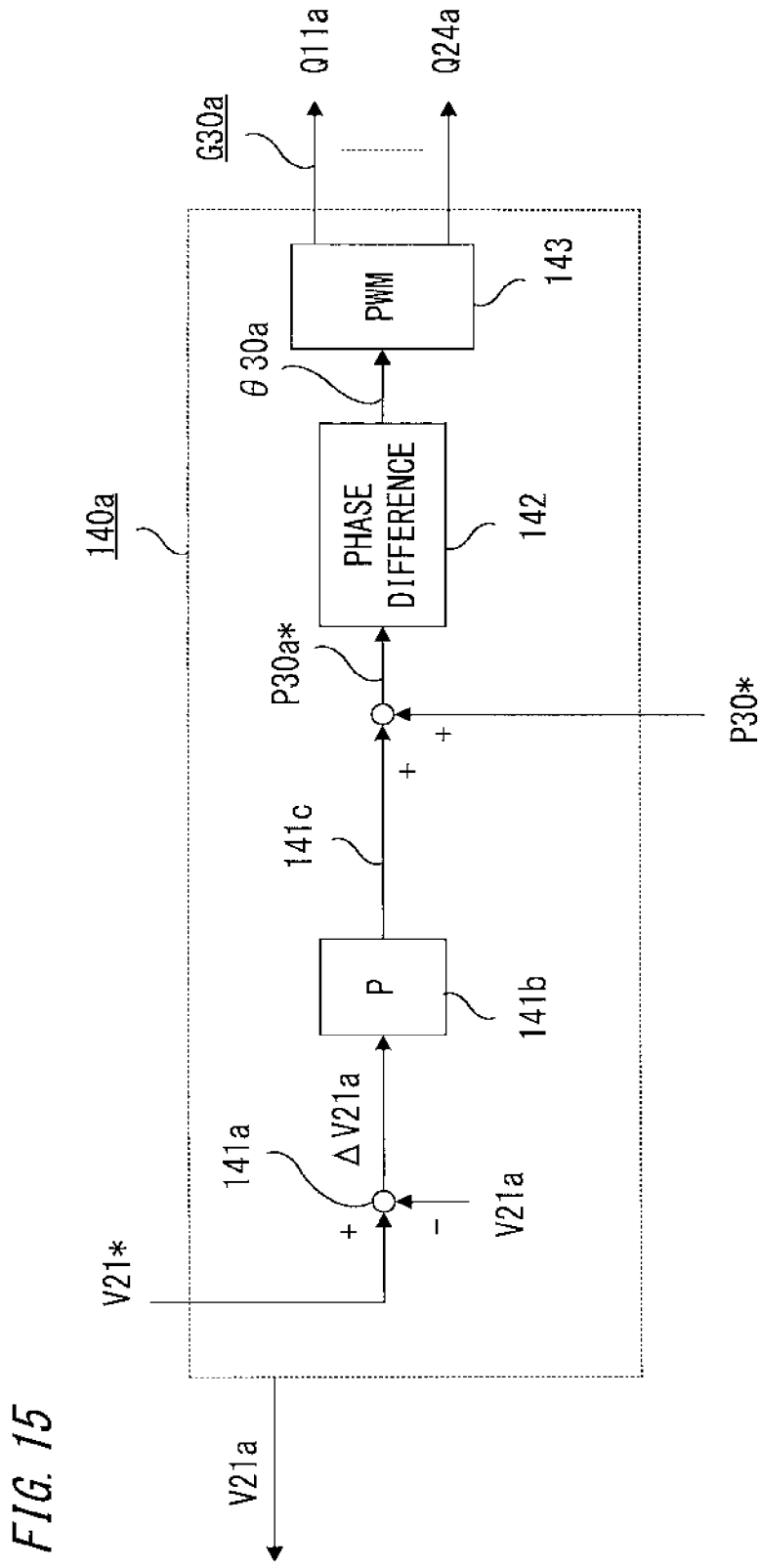
FIG. 15 is a control block diagram illustrating a cell control unit for controlling the converter cell, in the second control unit according to embodiment 3 of the present invention.
Figure 16:
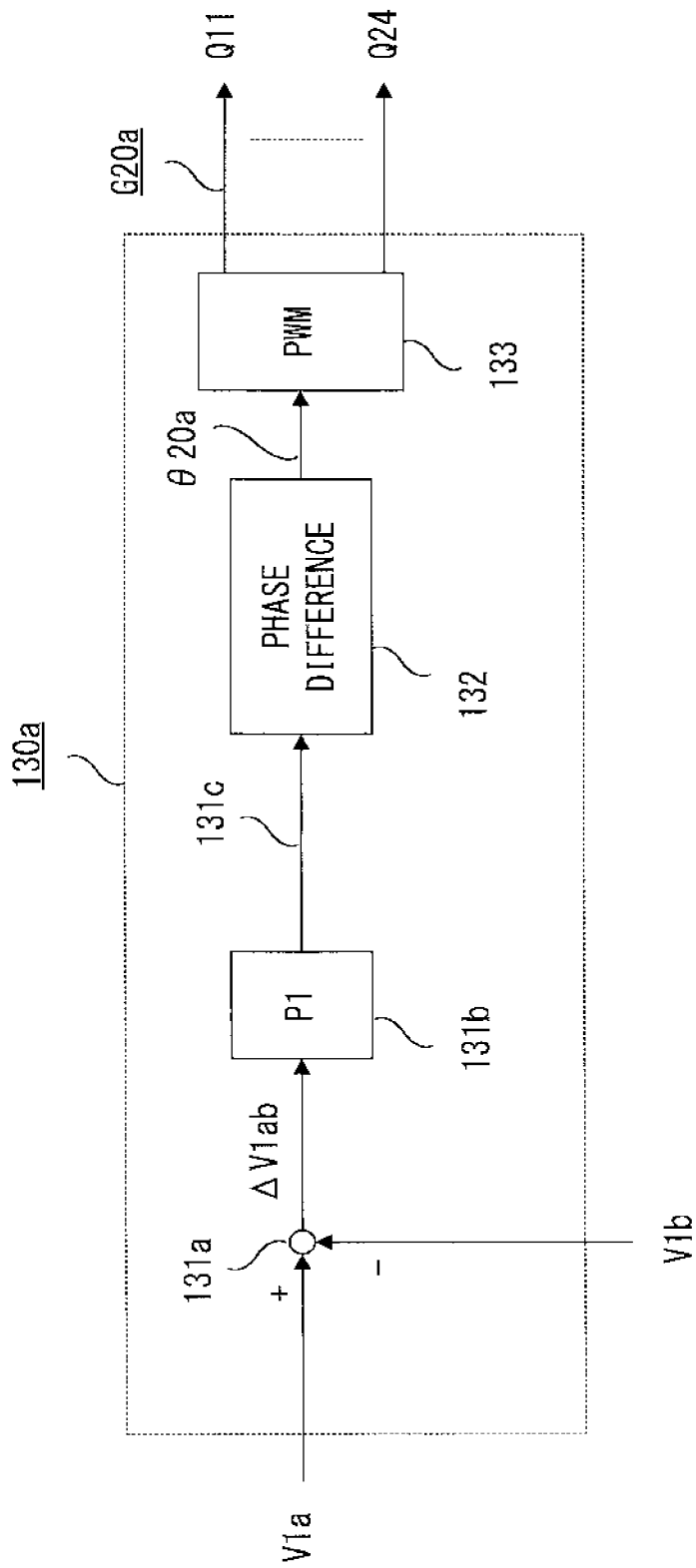
FIG. 16 is a control block diagram illustrating a third control unit for controlling an auxiliary converter according to embodiment 3 of the present invention.

FIG. 13 is a control block diagram showing the first control unit 110. FIG. 14 is a control block diagram showing the control unit 120aa for controlling the DC/DC converter 10a, and FIG. 15 is a control block diagram showing the cell control unit 140a for controlling the converter cell 30a in DC/DC converter 10a. FIG. 16 is a control block diagram showing the third control unit 130a for controlling the auxiliary converter 20a.

It is noted that FIG. 14 shows the details of the control unit 120aa shown in FIG. 11.

As shown in FIG. 12 and FIG. 13, the first control unit 110 receives voltages V1 (V1a to V1h) and voltages V2 (V2a to V2h) of the DC/DC converters 10 from the control units 120aa of the DC/DC converters 10. Then, the first control unit 110 transmits the voltages V1 (V1a to V1h) to the respective third control units 130.

The Vin calculation unit 111 calculates input voltage Vin, using the above Expression (1), and the Vout calculation unit 112 calculates output voltage Vout, using the above Expression (2). In the Vin control unit 113, a subtractor 113a calculates a deviation Vin between given target voltage Vin* and the input voltage Vin. A controller 113b generates a power command P* as a first command by proportional integral control so that the deviation ΔVin approaches 0.

The average value calculation unit 114 receives the output voltage Vout and the power command P*, and divides them by the number M of the DC/DC converters 10a to 10h. Thus, the command voltage V2* (=Vout/M) for voltage V2 of the second-side terminals 5B of each DC/DC converter 10, and the power command value P10* (=(P*/M)) used for control of each DC/DC converter 10, are generated. The generated command voltage V2* and power command value P10* are transmitted via a signal distributor 115 to the control units 120aa to 120ha in the respective second control units 120 (120a to 120h).

Next, the control unit 120aa in the second control unit 120a for controlling the DC/DC converter 10a will be described. It is noted that the control units 120ba to 120ha of the other second control units 120b to 120h are the same as the control unit 120aa.

As shown in FIG. 12 and FIG. 14, in the control unit 120aa, the command voltage V2* from the first control unit 110 and the voltage V2a are inputted and the voltages V21 (V21a to V21x) of the converter cells 30 are received from the respective cell control units 140 (140a to 140x). In addition, the control unit 120aa transmits the input and output voltage V1a, V2a of the DC/DC converter 10a to the first control unit 110.

As described above, the V2 calculation unit 125 calculates the voltage V2a using the above Expression (5) on the basis of the voltages V21 received from the respective cell control units 140.

In the V2 control unit 121, a subtractor 121a calculates a deviation ΔV2a between the command voltage V2* from the first control unit 110 and the voltage V2a. A controller 121b generates a first control command value 121c by proportional control so that the deviation ΔV2a approaches 0. The power command value P10* from the first control unit 110 is added to the first control command value 121c, whereby a control command P10a* for performing output control of the DC/DC converter 10a is generated.

The average value calculation unit 126 receives the voltage V2a and the control command P10a* and divides them by the number N of the converter cells 30a to 30x. Thus, command voltage V21* (=(V2a/N)) for voltage V21 of the DC terminals 15B of each converter cell 30, and a power command value P30* (=(P10a*/N)) used for control of each converter cell 30, are generated. The generated command voltage V21* and power command value P30* are transmitted via a signal distributor 127 to the cell control units 140 (140a to 140x).

Next, the cell control unit 140a for controlling the converter cell 30a in the DC/DC converter 10a will be described. It is noted that the other cell control units 140b to 140x are the same as the cell control unit 140a.

As shown in FIG. 12 and FIG. 15, the cell control unit 140a receives the command voltage V21* and the power command value P30* from the control unit 120aa. In addition, the cell control unit 140a detects voltage V21a of the DC terminals 15B which is output voltage of the converter cell 30a, and transmits the detected voltage V21a to the control unit 120aa.

In the cell control unit 140a, a subtractor 141a calculates a deviation ΔV21a between the command voltage V21* from the control unit 120aa and the voltage V21a. A controller 141b calculates a third control command value 141c by proportional control so that the deviation ΔV21a approaches 0. The power command value P30* (second control command value) from the control unit 120aa is added to the third control command value 141c, whereby a control command P30a* for performing output control of the converter cell 30a is generated.

A phase difference generator 142 outputs a difference θ30a between switching phases of the DC/AC conversion unit 12 and the DC/AC conversion unit 13 in the converter cell 30a, on the basis of the control command P30a*. A PWM signal generator 143 generates and outputs the gate signal G30a which is a PWM signal for performing switching control of each semiconductor switching element Q11a to Q24a in the converter cell 30a, on the basis of the phase difference θ30a.

In the cell control unit 140a, the control command P30a* for performing output control of the converter cell 30a is generated by adding the third control command value 141c and the power command value P30*, and the power command value P30* is generated by adding the first control command value 121c and the power command value P10*. That is, the control command P30a* for performing output control of the converter cell 30a is a power command for compensating variation in the input voltage Vin of the power conversion device 100, compensating variation in the output voltage V2a of the DC/DC converter 10a, and compensating variation in the output voltage V21a of the converter cell 30a.

Next, the third control unit 130a for controlling the auxiliary converter 20a will be described. It is noted that the other third control units 130b to 130g are the same as the third control unit 130a.

As shown in FIG. 12 and FIG. 16, the third control unit 130a receives the voltage V1a of the P terminals 25A and the voltage V1b of the N terminals 25B of the auxiliary converter 20a from the first control unit 110.

The third control unit 130a operates in the same manner as in the above embodiment 1. That is, in the third control unit 130a, a subtractor 131a calculates a voltage difference ΔV1ab between voltage V1a of the P terminals 25A and voltage V1b of the N terminals 25B. A V1 controller 131b generates a power command (control command) 131c for performing output control of the auxiliary converter 20a by proportional integral control so that the half of voltage difference ΔV1ab is compensated and voltage difference ΔV1ab approaches 0. Also in this case, control is performed such that, on the basis of comparison between voltage V1a of the P terminals 25A and voltage V1b of the N terminals 25B, command voltage is generated so as to decrease voltage of the high-voltage-side terminal by half the voltage difference ΔV1ab and thus power is received and passed from the high-voltage side to the low-voltage side so as to equalize the two DC voltages.

A phase difference generator 132 outputs a difference θ20a between switching phases of the DC/AC conversion unit 2 and the DC/AC conversion unit 3 in the auxiliary converter 20a, on the basis of the power command 131c. A PWM signal generator 133 generates and outputs the gate signal G20a which is a PWM signal for performing switching control of each semiconductor switching element Q11 to Q24 in the auxiliary converter 20a, on the basis of the phase difference θ20a.

As described above, powers transmitted by each converter cell 30 and each auxiliary converter 20 can be controlled by calculating the phase differences θ [rad] between the switching phase of the DC/AC conversion unit 12, 2 on the primary side and the switching phase of the DC/AC conversion unit 13, 3 on the secondary side.

That is, in the insulation-type converter cell 30 that performs DC/DC conversion, transmitted power P can be controlled by generating the phase difference θ for controlling output power, and performing switching such that the phase difference θ [rad] is provided between the primary-side circuit and the secondary-side circuit.

In this case, description will be given using the converter cell 30a shown in FIG. 10, as an example. The power P transmitted from the primary-side DC terminals 15A to the secondary-side DC terminals 15B is represented by the following Expression (6).

$$P=(V1a \cdot V21a/\omega LS) \cdot (\theta - \theta^2/\pi) \quad (6)$$

Here, ω is a value obtained by multiplying a switching frequency fsw by 2π.

Further, if the input voltage V1a and the output voltage V21a of the converter cell 30a are equal to each other and are set as V1a=V21a=Vdc, the above Expression (6) can be transformed into the following Expression (7).

$$P=(Vdc^2/\omega LS) \cdot (\theta - \theta^2/\pi) \quad (7)$$

From the above Expression (7), the phase difference θ for controlling the transmitted power can be calculated by the following Expression (8).

$$\theta=\pi/2-\sqrt{(\pi^2/4-(\pi P/Vdc^2) \cdot \omega LS)} \quad (8)$$

Here, in the converter cell 30a, when the DC voltage V21a applied to the DC capacitor 7a on the secondary side varies by ΔV21a from the command voltage V21*, electrostatic energy W stored in the DC capacitor 7a is calculated by the following Expression (9).

$$W = (1/2)Cdc(V21*\pm\Delta V21a)^2 \quad (9)$$
$$= (1/2)Cdc(V21*^2 + \Delta V21a^2) \pm Cdc \cdot V21* \cdot \Delta V21a$$

Here, Cdc is the capacitance of the DC capacitor 7a.

Normally, variation ΔV21a of the DC voltage is slight as compared to the command voltage V21*. Therefore, the above Expression (9) can be deformed into the following Expression (10).

$$W \approx (1/2)Cdc \cdot V21*^2 \pm Cdc \cdot V21* \cdot \Delta V21 \quad (10)$$

That is, a variation amount Δw in the electrostatic energy W that occurs due to the voltage variation ΔV21a of the DC voltage V21a applied to the DC capacitor 7a on the secondary side is represented by the second term on the right-hand side of the above Expression (10).

Therefore, control of the output voltage V21a of the converter cell 30a can be performed by increasing or decreasing the transmitted power of the converter cell 30a by power Pa that compensates the variation amount Δw of the electrostatic energy W. The power Pa that compensates the variation amount Δw can be calculated by the following Expression (11).

$$Pa = (d/dt) \cdot \Delta w \quad (11)$$
$$= Cdc \cdot V21* \cdot (d/dt) \cdot \Delta V21a$$

The power Pa calculated by the above Expression (11) is power that compensates slight voltage variation ΔV21a occurring in the DC voltage V21a applied to the DC capacitor 7a on the secondary side, and therefore the power Pa is smaller as compared to the transmitted power of the converter cell 30a. In this case, the corresponding phase difference θa also becomes small, and therefore the above Expression (7) can be approximated as shown by the following Expression (12).

$$Pa \approx (Vdc^2/\omega LS) \cdot \theta a \quad (12)$$

By deforming the above Expression (12), the following Expression (13) can be obtained.

$$\theta a(\omega LS/Vdc^2) \cdot Pa \quad (13)$$

By using Expression (13) for calculating the phase difference θa for controlling the transmitted power Pa, it is possible to easily obtain the phase difference as compared to the above Expression (8).

In the present embodiment, in control of each converter cell 30 and control of each auxiliary converter 20, when the phase difference is calculated from the power command (control command), the calculation is performed using the above Expression (13). That is, when the phase difference generator 142 in the cell control unit 140 and the phase difference generator 132 in the third control unit 130 each calculate the phase difference, a value obtained by calculation of the right-hand side of the above Expression (13) is used. Thus, the calculation becomes easy and the configurations of the control units 130, 140 can be simplified.

As described above, in the present embodiment 3, the power conversion device 100 has a plurality of DC/DC converters 10 connected to each other, and has auxiliary converters 20 each provided between two DC/DC converters 10, on the input side. Further, each DC/DC converter 10 is composed of a plurality of converter cells 30, the input sides of the plurality of converter cells 30 in each DC/DC converter 10 are connected in parallel, and the output sides thereof are connected so that common current flows. Therefore, the same effects as in the above embodiment 1 are obtained, and in addition, the following effects are obtained.

Since the input sides of the plurality of converter cells 30 are connected in parallel and the output sides thereof are connected so that common current flows, each DC/DC converter 10 can have a great step-up ratio. In addition, the output voltages of the converter cells 30 are equally controlled by the cell control units 140, so that power loads thereof can be equalized. Therefore, it becomes possible to reduce a margin provided in consideration of errors such as variation in components and detection errors of detectors, whereby size reduction and cost reduction of the converter cells 30 can be achieved.

Each auxiliary converter 20 only has to transmit power corresponding to half the difference voltage between the input voltages of two DC/DC converters 10. Since the input voltage of each DC/DC converter 10 is the same as the input voltages of the converter cells 30 in the DC/DC converter 10, the power capacity of the auxiliary converter 20 can be made smaller than the power capacities of the converter cells 30.

In the above embodiment, the first control unit 110 uses proportional integral control for calculation of the power command P* for controlling the input voltage Vin, and the third control unit 130 uses proportional integral control for calculation for output control of each auxiliary converter 20. Using the proportional integral control enables enhancement of accuracy of the voltage control.

Here, the input voltage Vin of the power conversion device 100 is voltage of the power transmission system 1, and therefore needs to be controlled with high accuracy. In this case, since the Vin control unit 113 is configured with the proportional integral controller (controller 113b), high-accuracy control can be performed.

In the second control unit 120, proportional control is used for calculations of the first control command value 121c for output control of each DC/DC converter 10 and the third control command value 141c for output control of each converter cell 30.

The output voltage V2 of the DC/DC converter 10 is controlled using the average value as the command voltage V2*. The first control command value 121c calculated using proportional control compensates only an amount corresponding to variation relative to the average value. Similarly, the third control command value 141c calculated using proportional control compensates only an amount corresponding to variation relative to the average value of output voltage of each converter cell 30.

If output powers of all the converter cells 30 are summed, the powers for compensating only the amount corresponding to variation relative to the average value are cancelled with each other, and eventually, the power for controlling the input voltage Vin of the power conversion device 100 remains and is outputted. Thus, control of the input voltage Vin of the power conversion device 100 and output voltage control of each DC/DC converter 10 and each converter cell 30 can be performed without interfering with each other.

In the above embodiment 3, output voltages of the converter cells 30 in the DC/DC converter 10a are detected by the respective cell control units 140 in the second control unit 120a. However, these output voltages may be detected by the control unit 120aa, or may be detected by the first control unit 110.

In the present embodiment 3, the DC/DC converters 10 each composed of a plurality of converter cells 30 are applied to embodiment 1. However, such DC/DC converters 10 may be applied to the above embodiment 2. That is, each auxiliary converter 20 may be provided between two DC/DC converters 10, on the output side, and also in this case, the same effects can be obtained.

Embodiment 4

The DC/DC converters 10, the auxiliary converters 20, and the converter cells 30 used in the above embodiments 1 to 3 have such a configuration that full-bridge circuits each formed by two switching legs are provided on both sides of a transformer. However, a configuration having three-phase bridge circuits may be employed.

In a power conversion device according to the present embodiment 4, the converter cells shown in the above embodiment 3 are configured such that three-phase bridge circuits each formed by three switching legs are provided on both sides of a transformer. The other configurations are the same as in the above embodiment 3.

Also in this case, each DC/DC converter 10 includes a plurality of converter cells 40 between the first-side terminals 5A and the second-side terminals 5B. The controller of the power conversion device 100 includes: a first control unit 110 for controlling the entire main circuit; second control units 120 for controlling the respective DC/DC converters 10; and third control units 130 for controlling the respective auxiliary converters 20. Each second control unit 120 includes a control unit for the DC/DC converter 10 and cell control units 140 for controlling the respective converter cells 40.

Figure 17:
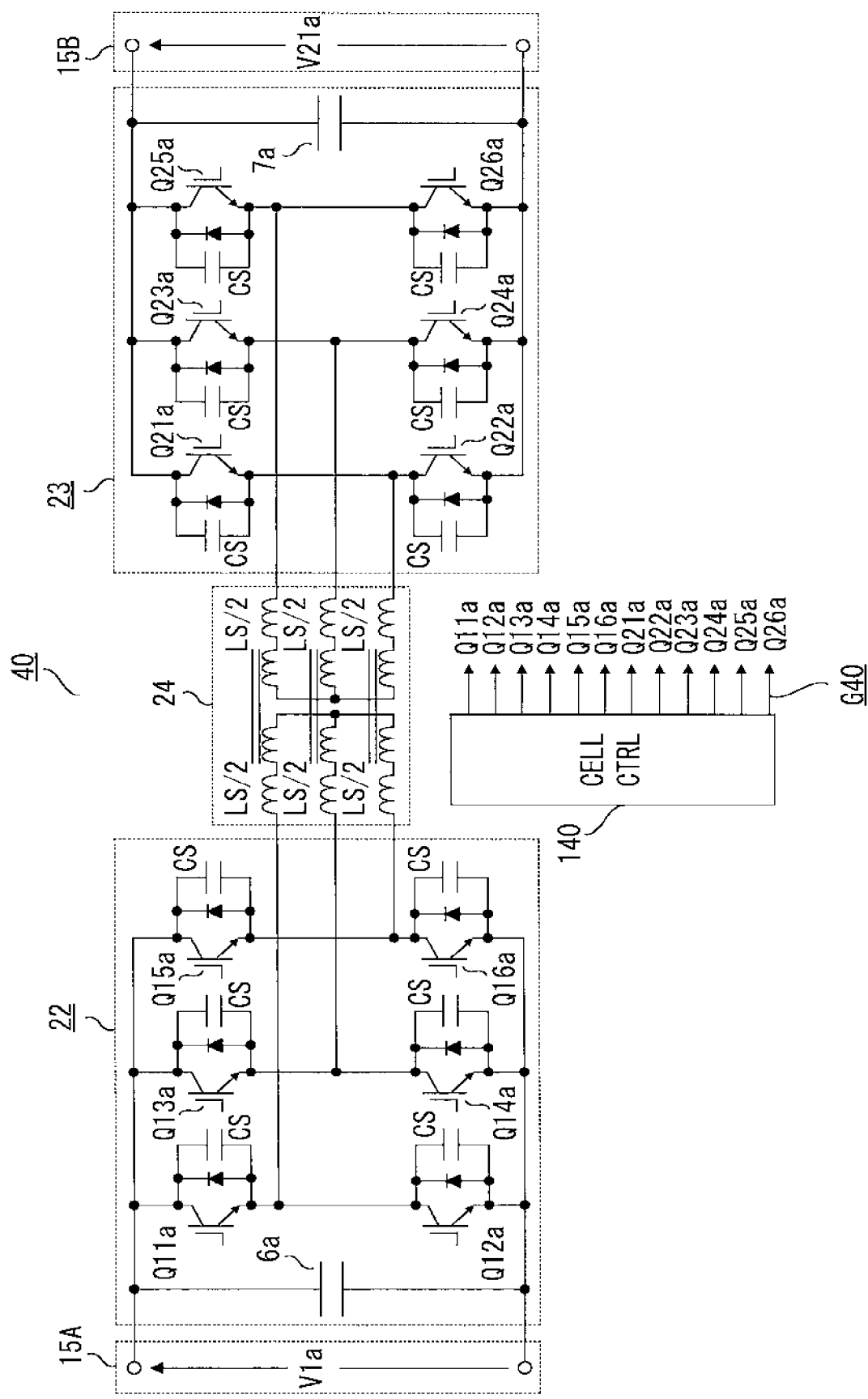
FIG. 17 is a circuit diagram showing a converter cell according to embodiment 4 of the present invention.

FIG. 17 is a circuit diagram of each converter cell 40 according to the present embodiment 4.

Each converter cell 40 includes, between primary-side DC terminals 15A as A terminals and secondary-side DC terminals 15B as B terminals, a DC/AC conversion unit 22 on the primary side, a DC/AC conversion unit 23 on the secondary side, and a three-phase transformer 24 as a transformer. The cell control units 140 are provided for the respective converter cells 40.

Regarding the plurality of converter cells 40 in each DC/DC converter 10, the DC terminals 15A on the primary side are connected in parallel to the first-side terminals 5A of the DC/DC converter 10, and the DC terminals 15B on the secondary side are connected so that common current flows between both poles of the second-side terminals 5B of the DC/DC converter 10. That is, the input sides of the plurality of converter cells 40 composing the DC/DC converter 10 are connected in parallel and the output sides thereof are connected so that common current flows.

As shown in FIG. 17, the DC/AC conversion unit 22 on the primary side includes: a DC capacitor 6a connected between both poles of the DC terminals 15A; and a first three-phase bridge circuit formed by three switching legs composed of semiconductor switching elements Q11a to Q16a as positive-side and negative-side semiconductor elements connected in series. The DC/AC conversion unit 23 on the secondary side includes: a DC capacitor 7a connected between both poles of the DC terminals 15B; and a second three-phase bridge circuit formed by three switching legs composed of semiconductor switching elements Q21a to Q26a as positive-side and negative-side semiconductor elements connected in series. The three-phase transformer 24 is connected between intermediate connection points of the switching legs of the DC/AC conversion unit 22 and intermediate connection points of the switching legs of the DC/AC conversion unit 23.

As the semiconductor switching elements Q11a to Q26a, for example, semiconductor switching elements having a self-turn-off function, such as IGBTs, to which diodes are connected in antiparallel are used. Each semiconductor switching element Q11a to Q26a may be used with a plurality of semiconductor switching elements combined in parallel, depending on the current capacity.

In this case, a snubber capacitor CS is connected in parallel to each semiconductor switching element Q11a to Q26a. Owing to effects of the snubber capacitor CS and the inductance LS of the AC output line, zero voltage switching which is soft switching of each semiconductor switching element Q11a to Q26a becomes possible.

Each cell control unit 140 generates gate signals G40 for the semiconductor switching elements Q11a to Q26a in the converter cell 40, thereby controlling switching of the semiconductor switching elements Q11a to Q26a.

In this case, by soft switching of the semiconductor switching elements Q11a to Q26a, switching loss can be reduced, the operation frequency can be increased, and the size of the three-phase transformer 24 can be reduced.

It is noted that, as the three-phase transformer 24, three single-phase transformers may be used instead of one three-phase transformer. As in the above embodiment 3, leakage inductance LS of the three-phase transformer 24 is shown, but the leakage inductance of the three-phase transformer 24 may not necessarily be used, and additional inductances may be used. It is noted that, if insulation is not needed, only inductance LS may be connected instead of the three-phase transformer 24.

Since each converter cell 40 has a three-phase bridge circuit, ripple current flowing through the DC capacitors 6a, 7a can be reduced and the capacitances of the DC capacitors 6a, 7a can be reduced. Therefore, the size of the power conversion device 100 can be reduced.

Also in the present embodiment, in each converter cell 40, since the DC terminals 15A are connected in parallel to the first-side terminals 5A of the DC/DC converter 10, the DC voltage V1a applied to the first-side terminals 5A is applied to the DC terminals 15A. Further, the converter cell 40 is a circuit that converts the DC voltage V1a to DC voltage V21a applied to the DC terminals 15B, via the DC/AC conversion unit 22, the three-phase transformer 24, and the DC/AC conversion unit 23, and can be freely controlled so as to perform bidirectional power conversion. It is desirable that the turns ratio of the three-phase transformer 24 is matched with the ratio of the DC voltage V1a on the primary side and the DC voltage V21a on the secondary side.

It is noted that the DC/DC converter 10 composed of the plurality of converter cells 40, in normal operation, steps up the primary-side voltage V1a and outputs the secondary-side voltage V2a, but the operation of each converter cell 40 is not limited to step-up operation.

As in the above embodiment 3, powers transmitted by each converter cell 40 can be controlled by calculating the phase differences θ [rad] between the switching phase of the DC/AC conversion unit 22 on the primary side and the switching phase of the DC/AC conversion unit 23 on the secondary side.

That is, in the insulation-type converter cell 40 that performs DC/DC conversion, transmitted power P can be controlled by generating the phase difference θ for controlling output power, and performing switching such that the phase difference θ [rad] is provided between the primary-side circuit and the secondary-side circuit.

In this case, description will be given using the converter cell 40 shown in FIG. 17, as an example. The power P transmitted from the primary-side DC terminals 15A to the secondary-side DC terminals 15B is represented by the following Expression (14).

$$P=(V1a \cdot V21a/\omega LS) \cdot [(2/3) \cdot \theta - \theta^2/(2\pi)] \quad (14)$$

Here, ω is a value obtained by multiplying a switching frequency fsw by 2π.

Further, if the input voltage V1a and the output voltage V21a of the converter cell 40 are equal to each other and are set as V1a=V21a=Vdc, the above Expression (14) can be transformed into the following Expression (15).

$$P=(Vdc^2/\omega LS) \cdot [(2/3) \cdot \theta - \theta^2/(2\pi)] \quad (15)$$

From the above Expression (15), the phase difference θ for controlling the transmitted power can be calculated by the following Expression (16).

$$\theta = 2\pi/3 - \sqrt{(4\pi^2/9 - (2\pi P/Vdc^2) \cdot \omega LS)} \quad (16)$$

As in the above embodiment 3, normally, the variation ΔV21a of the DC voltage is slight as compared to the command voltage V21*. For performing the control of the output voltage V21a of the converter cell 40, power that compensates slight voltage variation ΔV21a occurring in the DC capacitor 7a on the secondary side is used and this power is smaller as compared to transmitted power of the converter cell 40. A phase difference corresponding to the power Pa that compensates this slight voltage variation ΔV21a also becomes small, and therefore, as in the above embodiment 3, the above Expression (15) can be approximated as shown by the following Expression (17).

$$Pa \approx (2/3) \cdot (Vdc^2/\omega LS) \cdot \theta a \quad (17)$$

By deforming the above Expression (17), the following Expression (18) can be obtained.

$$\theta a \approx (3/2) \cdot (\omega LS/Vdc^2) \cdot Pa \quad (18)$$

The phase difference θa for controlling the transmitted power Pa can be calculated using Expression (18), and thus the phase difference can be easily obtained as compared to the above Expression (16).

In the present embodiment, in control of each converter cell 40, when the phase difference is calculated from the power command (control command), the calculation is performed using the above Expression (18). That is, when the phase difference generator 142 in each cell control unit 140 calculates the phase difference, a value obtained by calculation of the right-hand side of the above Expression (18) is used. Thus, the configuration of the cell control unit 140 can be simplified.

As described above, in the present embodiment 4, the power conversion device 100 has a plurality of DC/DC converters 10 connected to each other, and has auxiliary converters 20 each provided between the DC/DC converters 10, on the input side. Further, each DC/DC converter 10 is composed of a plurality of converter cells 40, the input sides of the plurality of converter cells 40 in each DC/DC converter 10 are connected in parallel, and the output sides thereof are connected so that common current flows. Therefore, the same effects as those in the above embodiment 3 are obtained.

In addition, since each converter cell 40 has a three-phase bridge circuit, ripple current flowing through the DC capacitors 6a, 7a can be reduced and the size of the power conversion device 100 can be reduced.

In the present embodiment, the DC/DC converters 10 each composed of a plurality of converter cells 40 are applied to embodiment 1. However, such DC/DC converters 10 may be applied to the above embodiment 2. That is, each auxiliary converter 20 may be provided between two DC/DC converters 10, on the output side, and also in this case, the same effects can be obtained.

Also the auxiliary converters 20 may have such a configuration that a three-phase bridge circuit as shown in FIG. 17 is provided on both sides of a three-phase transformer 24. In this case, when the phase difference generator 132 calculates the phase difference, a value obtained by calculation of the right-hand side of the above Expression (18) is used. Thus, the configuration of the third control unit 130 can also be simplified.

The same circuit configuration as shown in FIG. 17 may be applied to the DC/DC converters 10 in the above embodiments 1, 2, and also in this case, the same effects are obtained.

Normally, silicon is used for the semiconductor switching elements Q in the DC/DC converters 10, the auxiliary converters 20, and the converter cells 30, 40 used in the above embodiments. However, semiconductor switching elements made of silicon carbide, gallium nitride, diamond, or the like as wide bandgap semiconductors having wider bandgaps than silicon may be used. In this case, usage at higher voltage becomes possible, and further, higher-speed switching can be performed, whereby size reduction of the transformers 4, 14, 24 can be achieved.

It is noted that, within the scope of the present invention, the above embodiments may be freely combined with each other, or each of the above embodiments may be modified or simplified as appropriate.

The invention claimed is:

1. A power conversion device, comprising:
a power conversion unit including M number of DC/DC converters between a pair of first DC terminals and a pair of second DC terminals, wherein each pair includes a positive terminal and a negative terminal, M is two or greater, and the power conversion unit performs power transmission between the pair of first DC terminals and the pair of second DC terminals; and
a controller that controls the power conversion unit, wherein
the power conversion unit further includes one or more balancing circuits, each balancing circuit connected between two of the DC/DC converters and balancing powers of the two DC/DC converters,
in the M number of DC/DC converters, one of input and output thereof is defined as a first side and the other one is defined as a second side, first-side terminals of the DC/DC converters are connected so that current flows in common between both positive and negative terminals of the first DC terminals, and second-side terminals of the DC/DC converters are connected so that current flows in common between both positive and negative terminals of the second DC terminals,
the balancing circuits are auxiliary converters that perform DC/DC conversion, each balancing circuit is connected between two pairs of the first-side terminals of the two DC/DC converters,
the controller controls each balancing circuit to receive and pass power between the two pairs of first-side terminals, and
the controller performs output control of each balancing circuit to equalize DC voltages of the two pairs of the first-side terminals of the corresponding two DC/DC converters.

2. The power conversion device according to claim 1, wherein the power conversion unit includes M-1 number of the balancing circuits.

3. The power conversion device according to claim 1, wherein the controller includes:
a first control circuit which generates a first command so that voltage of input terminals, of the first DC terminals and the second DC terminals, approaches a target voltage, and calculates a command voltage for the second-side terminals of each DC/DC converter, from voltage of the second DC terminals;
a second control circuit that performs output control of each DC/DC converter so that the voltage of the second-side terminals of the DC/DC converter approaches the command voltage, on the basis of the first command and the command voltage; and
a third control circuit that controls input and output voltages of each balancing circuit, and thereby the controller performs output control of the DC/DC converters and the balancing circuits.

4. The power conversion device according to claim 3, wherein the third control circuit performs the output control of the corresponding balancing circuit so as to equalize DC voltages of the two pairs of first-side terminals of the two DC/DC converters.

5. The power conversion device according to claim 4, wherein the third control circuit performs output control of the corresponding balancing circuit so that power is received and passed from a high-voltage side to a low-voltage side of the DC voltages of the two pairs of the first-side terminals which are the input and output voltages of the balancing circuit.

6. The power conversion device according to claim 3, wherein the command voltage for the second-side terminals of each DC/DC converter is calculated by dividing the voltage of the second DC terminals by the number M of the DC/DC converters.

7. The power conversion device according to claim 6, wherein the second control circuit calculates a first control command value so that the voltage of the second-side terminals of the corresponding DC/DC converter approaches the command voltage, and adds, to the first control command value, a value calculated by dividing the first command generated by the first control circuit by the number M of the DC/DC converters, thereby calculating a control command for performing output control of the corresponding DC/DC converter.

8. The power conversion device according to claim 1, wherein the power conversion unit is configured to step up DC voltage inputted to the first DC terminals and output the resultant voltage to the second DC terminals, each DC/DC converter operates using the first side as an input side and using the second side as an output side, and the balancing circuits are provided on the input sides of the DC/DC converters.

9. The power conversion device according to claim 1, wherein the power conversion unit is configured to step up DC voltage inputted to the second DC terminals and output the resultant voltage to the first DC terminals, each DC/DC converter operates using the second side as an input side and using the first side as an output side, and the balancing circuits are provided on the output sides of the DC/DC converters.

10. The power conversion device according to claim 1, wherein
each DC/DC converter includes:
a first full-bridge circuit connected between both poles of the first-side terminals and formed by two switching legs each composed of positive-side and negative-side semiconductor elements connected in series;
a second full-bridge circuit connected between both poles of the second-side terminals and formed by two switching legs each composed of positive-side and negative-side semiconductor elements connected in series; and
a transformer connected between intermediate connection points of the respective switching legs of the first full-bridge circuit and intermediate connection points of the respective switching legs of the second full-bridge circuit, and each semiconductor element in the first and second full-bridge circuits is a semiconductor switching element to which a snubber capacitor is connected in parallel.

11. The power conversion device according to claim 10, wherein
each DC/DC converter includes a plurality of converter cells, and each converter cell includes the first full-bridge circuit, the second full-bridge circuit, and the transformer, and
in the plurality of converter cells of each DC/DC converter, DC terminals of the first full-bridge circuits are connected in parallel to the first-side terminals of the DC/DC converter, and DC terminals of the second full-bridge circuits are connected so that current flows in common between both poles of the second-side terminals of the DC/DC converter.

12. The power conversion device according to claim 1, wherein
each DC/DC converter includes:
a first three-phase bridge circuit connected between both poles of the first-side terminals and formed by three switching legs composed of positive-side and negative-side semiconductor elements connected in series;
a second three-phase bridge circuit connected between both poles of the second-side terminals and formed by three switching legs composed of positive-side and negative-side semiconductor elements connected in series; and
a transformer connected between intermediate connection points of the respective switching legs of the first three-phase bridge circuit and intermediate connection points of the respective switching legs of the second three-phase bridge circuit, and
each semiconductor element in the first and second three-phase bridge circuits is a semiconductor switching element to which a snubber capacitor is connected in parallel.

13. The power conversion device according to claim 12, wherein
each DC/DC converter includes a plurality of converter cells, and each converter cell includes the first three-phase bridge circuit, the second three-phase bridge circuit, and the transformer, and
in the plurality of converter cells of each DC/DC converter, DC terminals of the first three-phase bridge circuits are connected in parallel to the first-side terminals of the DC/DC converter, and DC terminals of the second three-phase bridge circuits are connected so that current flows in common between both poles of the second-side terminals of the DC/DC converter.

14. A power conversion device, comprising:
a power conversion unit including M number of DC/DC converters between a pair of first DC terminals and a pair of second DC terminals, wherein each pair includes a positive terminal and a negative terminal, M is two or greater, and the power conversion unit performs power transmission between the pair of first DC terminals and the pair of second DC terminals; and
a controller that controls the power conversion unit, wherein
the power conversion unit further includes one or more balancing circuits, each balancing circuit connected between two of the DC/DC converters and balancing powers of the two DC/DC converters,
in the M number of DC/DC converters, one of input and output thereof is defined as a first side and the other one is defined as a second side, first-side terminals of the DC/DC converters are connected so that current flows in common between both positive and negative terminals of the first DC terminals, and second-side terminals of the DC/DC converters are connected so that current flows in common between both positive and negative terminals of the second DC terminals,
each balancing circuit is connected between two pairs of the first-side terminals of the two DC/DC converters,
the controller controls each balancing circuit to receive and pass power between the two pairs of first-side terminals,
each balancing circuit includes:
a third full-bridge circuit connected between both poles of one pair of the two pairs of first-side terminals, and formed by two switching legs each composed of positive-side and negative-side semiconductor elements connected in series;
a fourth full-bridge circuit connected between both poles of the other pair of the two pairs of first-side terminals, and formed by two switching legs each composed of positive-side and negative-side semiconductor elements connected in series; and
a transformer connected between intermediate connection points of the respective switching legs of the third full-bridge circuit and intermediate connection points of the respective switching legs of the fourth full-bridge circuit, and
each semiconductor element in the third and fourth full-bridge circuits is a semiconductor switching element to which a snubber capacitor is connected in parallel.

15. A power conversion device, comprising:
a power conversion unit including M number of DC/DC converters between a pair of first DC terminals and a pair of second DC terminals, wherein each pair includes a positive terminal and a negative terminal, M is two or greater, and the power conversion unit performs power transmission between the pair of first DC terminals and the pair of second DC terminals; and
a controller that controls the power conversion unit, wherein
the power conversion unit further includes one or more balancing circuits, each balancing circuit connected between two of the DC/DC converters and balancing powers of the two DC/DC converters,
in the M number of DC/DC converters, one of input and output thereof is defined as a first side and the other one is defined as a second side, first-side terminals of the DC/DC converters are connected so that current flows in common between both positive and negative terminals of the first DC terminals, and second-side terminals of the DC/DC converters are connected so that current flows in common between both positive and negative terminals of the second DC terminals,
each balancing circuit is connected between two pairs of the first-side terminals of the two DC/DC converters,
the controller controls each balancing circuit to receive and pass power between the two pairs of first-side terminals,
each balancing circuit includes:
a third three-phase bridge circuit connected between both poles of one pair of the two pairs of first-side terminals, and formed by three switching legs each composed of positive-side and negative-side semiconductor elements connected in series;
a fourth three-phase bridge circuit connected between both poles of the other pair of the two pairs of first-side terminals, and formed by three switching legs each composed of positive-side and negative-side semiconductor elements connected in series; and a transformer connected between intermediate connection points of the respective switching legs of the third three-phase bridge circuit and intermediate connection points of the respective switching legs of the fourth three-phase bridge circuit, and each semiconductor element in the third and fourth three-phase bridge circuits is a semiconductor switching element to which a snubber capacitor is connected in parallel.

16. The power conversion device according to claim 7, wherein each DC/DC converter includes N number of converter cells which each perform DC/DC conversion and of which A terminals as DC terminals on one side are connected in parallel to the first-side terminals of the DC/DC converter, and B terminals as DC terminals on the other side are connected so that current flows in common between both poles of the second-side terminals of the DC/DC converter, the second control circuit includes a cell control circuit that performs output control of each converter cell so that voltage of the B terminals of the converter cell approaches B voltage which is command voltage, and calculates the B voltage and a second control command value by respectively dividing the voltage of the second-side terminals of the corresponding DC/DC converter and the control command for the corresponding DC/DC converter by the number N of the converter cells, and the cell control circuit calculates a third control command value so that the voltage of the B terminals of the corresponding converter cell approaches the B voltage, and adds the second control command value to the third control command value, thereby calculating a control command for performing output control of the converter cell.

17. The power conversion device according to claim 16, wherein the first control circuit uses proportional integral control to calculate the first command for controlling the voltage of the input terminals, the second control circuit uses proportional control to calculate the third control command value and the first control command value for output control of the corresponding DC/DC converter, and the third control circuit uses proportional integral control to calculate an output control of the corresponding balancing circuit.

18. The power conversion device according to claim 10, wherein each semiconductor switching element is made of a wide bandgap semiconductor having a wider bandgap than silicon.

19. The power conversion device according to claim 1, wherein DC power obtained by collecting powers generated by a plurality of electric generation devices is inputted, voltage of the DC power is stepped up, and the resultant power is outputted to a DC power transmission line.

20. The power conversion device according to claim 2, wherein the controller includes:

a first control circuit which generates a first command so that voltage of input terminals, of the first DC terminals and the second DC terminals, approaches target voltage, and calculates command voltage for the second-side terminals of each DC/DC converter, from voltage of the second DC terminals;

a second control circuit that performs output control of each DC/DC converter so that the voltage of the second-side terminals of the DC/DC converter approaches the command voltage, on the basis of the first command and the command voltage; and a third control circuit that controls input and output voltages of each balancing circuit, and thereby the controller performs output control of the DC/DC converters and the balancing circuits.

* * * * *